US012744894B2

(12) United States Patent
Solovyev et al.

(10) Patent No.: US 12,744,894 B2
(45) Date of Patent: Sep. 22, 2026

(54) METHOD AND APPARATUS FOR DERIVING AN INTERPOLATION FILTER INDEX FOR A CURRENT BLOCK

(71) Applicant: HUAWEI TECHNOLOGIES CO., LTD., Shenzhen (CN)

(72) Inventors: Timofey Mikhailovich Solovyev, Munich (DE); Sergey Yurievich Ikonin, Moscow (RU); Roman Igorevich Chernyak, Munich (DE); Alexander Alexandrovich Karabutov, Munich (DE); Elena Alexandrovna Alshina, Munich (DE); Huanbang Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/204,055

(22) Filed: May 9, 2025

(65) Prior Publication Data

US 2025/0330574 A1 Oct. 23, 2025

Related U.S. Application Data

(63) Continuation of application No. 18/414,188, filed on Jan. 16, 2024, now Pat. No. 12,328,427, which is a (Continued)

(51) Int. Cl.

*H04N 19/105* (2014.01)
*H04N 19/132* (2014.01)

(Continued)

(52) U.S. Cl.

CPC ......... *H04N 19/105* (2014.11); *H04N 19/132* (2014.11); *H04N 19/137* (2014.11);

(Continued)

(58) Field of Classification Search

CPC .. H04N 19/105; H04N 19/132; H04N 19/137; H04N 19/159; H04N 19/176; H04N 19/82

(Continued)

(56) References Cited

U.S. PATENT DOCUMENTS

| | | | |
|---|---|---|---|
| 2004/0076237 A1 | 4/2004 | Kadono et al. |
| 2018/0098066 A1 | 4/2018 | Lee et al. |

(Continued)

FOREIGN PATENT DOCUMENTS

| | | |
|---|---|---|
| CN | 101663898 A | 3/2010 |
| CN | 101790092 A | 7/2010 |

(Continued)

OTHER PUBLICATIONS

Document: JCTVC-H0077, Shigeru Fukushima et al, Non-CE9: Merge candidates pruning without reference index, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, total 6 pages, XP030051474.

(Continued)

*Primary Examiner* — Allen C Wong
(74) *Attorney, Agent, or Firm* — WOMBLE BOND DICKINSON (US) LLP

(57) ABSTRACT

The present disclosure relates to video encoding and decoding, and in particular, a method for inter prediction for a block in a frame of a video signal includes: constructing a history-based motion information candidate list, wherein the list is an ordered list comprising N history-based motion information candidates $H_k$ containing motion information of N preceding blocks preceding the block, wherein each history-based motion information candidate comprises: one or more motion vectors (MVs), one or more reference picture indices corresponding to the MVs, and an interpo- (Continued)

lation filter index; adding one or more history-based motion information candidates from the history-based motion information candidate list into a motion information candidate list for the block; and deriving motion information for the block based on the motion information candidate list.

18 Claims, 21 Drawing Sheets

Related U.S. Application Data continuation of application No. 17/451,139, filed on Oct. 15, 2021, now Pat. No. 11,924,407, which is a continuation of application No. PCT/CN2020/085681, filed on Apr. 20, 2020.

(60) Provisional application No. 62/909,761, filed on Oct. 2, 2019, provisional application No. 62/909,763, filed on Oct. 2, 2019, provisional application No. 62/845,938, filed on May 10, 2019, provisional application No. 62/836,072, filed on Apr. 19, 2019.

(51) Int. Cl.

| | |
|---|---|
| ***H04N 19/137*** | (2014.01) |
| ***H04N 19/159*** | (2014.01) |
| ***H04N 19/176*** | (2014.01) |
| ***H04N 19/82*** | (2014.01) |

(52) U.S. Cl.

CPC ......... *H04N 19/159* (2014.11); *H04N 19/176* (2014.11); *H04N 19/82* (2014.11)

(58) Field of Classification Search

USPC ...................................................... 375/240.02

See application file for complete search history.

(56) References Cited

U.S. PATENT DOCUMENTS

| | | | | |
|---|---|---|---|---|
| 2020/0244971 | A1* | 7/2020 | Wang | H04N 19/172 |
| 2021/0385483 | A1* | 12/2021 | Liu | H04N 19/176 |

FOREIGN PATENT DOCUMENTS

| | | | |
|---|---|---|---|
| CN | 102638678 | A | 8/2012 |
| CN | 108141589 | A | 6/2018 |
| CN | 109196864 | A | 1/2019 |
| CN | 109417630 | A | 3/2019 |
| JP | 7708823 | B2 | 7/2025 |
| KR | 1020130098121 | A | 9/2013 |
| KR | 20180107762 | A | 10/2018 |
| KR | 1020210089153 | A | 7/2021 |
| WO | 2020085954 | A1 | 4/2020 |
| WO | 2020200236 | A1 | 10/2020 |

OTHER PUBLICATIONS

ITU-T H.264(Apr. 2017), Series H: Audiovisual and Multimedia Systems, Infrastructure of audiovisual services—Coding of moving video, Advanced video coding for generic audiovisual services, total 812 pages.

Document: JVET-L0266-v1, Li Zhang et al, Suggested specification changes for JVET-L0266, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages, XP030250949.

Document: JVET-L0266-v2, Li Zhang et al, CE4: History-based Motion Vector Prediction (Test 4.4.7), Joint Video Experts Team (JVET) of ITU-T SG 16 WP 3 and ISO/IEC JTC 1/SC 29/WG11, 12th Meeting: Macao, CN, Oct. 3-12, 2018, total 6 pages, XP030194670.

ITU-T H.265(Feb. 2018), Series H: Audiovisual and Multimedia Systems Infrastructure of audiovisual services—Coding of moving video, High efficiency video coding, total 692 pages.

Document: JVET-N0309, Anastasia Henkel et al, Non-CE4: Switched half-pel interpolation filter, Joint Video Experts Team (JVET) of ITU-T SG 16 WP 3 and ISO/IECJTC 1/SC 29/WG11, 14th Meeting: Geneva, CH, Mar. 19-27, 2019, total 7 pages, XP030202955.

Document: JVET-N0309-v3, Anastasia Henkel et al, Non-CE4: Switched half-pel interpolation filter, Joint Video Experts Team (JVET) of ITU-T SG 16 WP 3 and ISO/IEC JTC 1/SC 29/WG 11, 14th Meeting: Geneva, CH, Mar. 19-27, 2019, total 8 pages.

Document: JVET-N0373_v2, Hahyun Lee et al, Non-CE4: HMVP unification between the Merge and MVP list, Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.

Document: JVET-P0621, Antoine Robert et al, Motion information comparison, Joint Video Experts Team (JVET) of ITU-T SG 16 WP 3 and ISO/IECJTC 1/SC 29/WG11, 16th Meeting: Geneva, CH, Oct. 1-11, 2019, total 4 pages, XP030217880.

Document: JVET-P0856-v1, Timofey Solovyev et al, Non-CE4: On switchable interpolation filter and bi-prediction weight indices cleanup, Joint Video Experts Team (JVET) of ITU-T SG 16 WP 3 and ISO/IECJTC 1/SC 29/WG11, 16th Meeting: Geneva, CH,Oct. 1-11, 2019, total 5 pages, XP030218213.

Li Zhang, et al., CE4-related: History-based Motion Vector Prediction, [JVET-K0104-v5], Joint Video Experts Team (JVET) of ITU-T SG 16 WP 3 and ISO/IEC JTC 1/SC 29/WG 11 11th Meeting: Ljubljana, SI, Jul. 10-18, 2018, Jul. 18, 2018, pp. 1-7, Internet URL:http://phenix.it-sudparis.eu/jvet/doc_end_user/documents/11_Ljubljana/wg11/JVET-K0104-v5.zip>JVET-K0104_r4.docx >.

Zhang, L. et al., "CE4: History-based Motion Vector Prediction (Test 4.4.7)" JVET-L0266-v3 (JVET-L0266-r1.docx), JVET, 12th Meeting, Macao, https://jvet-experts.org/doc_end_user/documents/12_Macao/wg11/JVET-L0266-v3.zip, Oct. 4, 2018 (Oct. 4, 2018).

Chun-Chi Chen et al.,"Generalized bi-prediction for inter coding",oint Video Exploration Team (JVET) of ITU-T SG 16 WP 3 and ISO/IEC JTC 1/SC 29/WG 11 3rd Meeting: Geneva, CH, May 26, Jun. 1, 2016,JVET-C0047,total:4pages.

Jie Zhao et al., "AHG2: Regarding HMVP Table Size," Joint Video Experts Team (JVET) of ITU-T SG 16 WP 3 and ISO/IEC JTC 1/SC 29/WG 11, JVET-M0436, 13th Meeting: Marrakech, MA, Jan. 9-18, 2019, total 3 pages.

* cited by examiner

10

METHOD AND APPARATUS FOR DERIVING AN INTERPOLATION FILTER INDEX FOR A CURRENT BLOCK

CROSS REFERENCE TO RELATED APPLICATIONS

This application is a continuation of U.S. patent application Ser. No. 18/414,188, filed on Jan. 16, 2024, which is a continuation of U.S. patent application Ser. No. 17/451,139, filed on Oct. 15, 2021, now U.S. Pat. No. 11,924,407, which is a continuation of International Application No. PCT/CN 2020/085681, filed on Apr. 20, 2020, which claims the priority to U.S. Provisional Patent Application No. 62/836,072, filed Apr. 19, 2019 and the priority to U.S. Provisional Patent Application No. 62/845,938, filed May 10, 2019 and the priority to U.S. Provisional Patent Application No. 62/909,761, filed Oct. 2, 2019 and the priority to U.S. Provisional Patent Application No. 62/909,763, filed Oct. 2, 2019. All of the afore-mentioned patent applications are hereby incorporated by reference in their entireties.

TECHNICAL FIELD

Embodiments of the present disclosure generally relate to the field of picture processing, and more particularly to inter prediction method and apparatus for deriving an interpolation filter index for a current block, such as merging procedure for switchable interpolation filters parameters.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Recently, the switchable interpolation filter for the half-pixel (half-pel) position is introduced into Versatile Video Coding (VVC). The switching of the half-pel luma interpolation filter is done depending on the motion vector accuracy. In the case of half-pel motion vector accuracy, an alternative half-pel interpolation filter can be used and it is indicated by an additional syntax element indicating which interpolation filter is used, thus the signaling overhead is increased.

SUMMARY

Embodiments of the present application aim to provide apparatuses and methods for constructing a history-based motion information candidate list, so that the inheritance of the half-pixel (half-pel) interpolation filter index may be achieved when the history-based motion information candidate list is used, thus appropriative interpolation filter is selected instead of the default one that in turn improves the quality of the prediction signal and the coding efficiency.

Embodiments of the present application aim to provide apparatuses and methods for inter prediction for a current block which is coded in a skip/merge mode, so that the inheritance of the half-pixel interpolation filter index may be achieved when a history-based motion information candidate list is used, thus the quality of a video signal can be improved.

The foregoing and other objects are achieved by the subject matter of the independent claims. Further implementation forms are apparent from the dependent claims, the description and the figures.

According to a first aspect, a method for constructing a history-based motion information (HMI) candidate list is provided, the method can be performed by an encoding apparatus or a decoding apparatus, and the method comprises:

obtaining a history-based motion information candidate list, wherein the HMI list is an ordered list of N history-based motion information candidates $H_k$, k=0, . . . , N−1, associated with (or containing) motion information of a plurality of preceding blocks (e.g. N preceding blocks) preceding a block, wherein N is an integer number greater than 0 (for example, N is an integer number greater than 0 and is smaller than or equal to a predefined number (0<N<=5), wherein each history-based motion information candidate includes motion information of a corresponding preceding block including elements:

- i) one or more motion vectors, MVs of the corresponding preceding block (such as luma motion vectors in 1/16 fractional-sample accuracy mvL0 and/or mvL1, and the mvL0 and mvL1 corresponds to L0 and L1 reference picture lists),
- ii) one or more reference picture indices corresponding to the MVs of the corresponding preceding block (such as reference picture indices refIdxL0 and/or refIdxL1, and the refIdxL0 and refIdxL1 corresponds to L0 and L1 reference picture lists,), and
- iii) an interpolation filter (IF) index (such as an IF index of the corresponding preceding block or an IF index associated with of the corresponding preceding block);

updating the HMI list based on motion information of the block, wherein the motion information of the block includes elements:

- i) one or more motion vectors, MVs of the block (such as luma motion vectors in 1/16 fractional-sample accuracy mvL0 and/or mvL1),
- ii) one or more reference picture indices corresponding to the MVs of the block (such as reference indices refIdxL0 and/or refIdxL1), and
- iii) an interpolation filter index (such as an IF index of the block or an IF index associated with of the block).

In an embodiment, the interpolation filter (IF) index may refer to a fractional sample interpolation filter (IF) index, in particular, the IF index refers to the half-pixel (half-pel)

interpolation filter index or the half-sample interpolation filter index (hpelIfIdx). The terms "half-pixel interpolation filter(s)" and "half-sample interpolation filter(s)" may be used interchangeably in the present disclosure. The half-sample interpolation filter index indicates a half-pixel interpolation filter used for interpolating a half-pixel value in the case where at least one of the motion vectors of the corresponding block points to a half-pixel position. For example, if the one or more motion vectors (MVs) (element i) of the history-based motion information candidate have at least one MV pointing to a half-pixel position, the interpolation filter (IF) index (element iii) of the history-based motion information candidate indicates the half-pixel interpolation filter used for interpolating the half-pixel value (i.e. the interpolation filter index (element iii) make effect only for the HMI candidate containing half-pel MV(s)). If the one or more motion vectors (MVs) (element i) of the history-based motion information candidate have no MV pointing to a half-pixel position, the interpolation filter (IF) index (element iii) of the history-based motion information candidate becomes meaningless (i.e. this IF index does not have any effect for non-half-pel MVs, and the value of IF index for non-half-pel MVs does not have any sense. It can be set to the any value, e.g. as 0/FALSE). In this case, the interpolation filter (IF) index (element iii) is assigned a default value which is not used in later steps. The same applies to the motion information of the block. In other words, the interpolation filter index (element iii) of the motion information of the block is meaningful when at least one of the MVs of the block points to the half-pixel position. If none of the MVs points to a half-pixel position, the interpolation filter index (element iii) of the motion information is assigned a default value which is not used in later steps. In one exemplary implementation, the IF index is always stored in the HMI list, regardless of the MV fractional part, even if the IF index is meaningless in some cases. The HMI list can be implemented in this way to the design simplification. It can be understood that the value assigned to the IF index doesn't have any impact to the decoding result if both MVs of the corresponding block are not pointing to the half-pixel position.

In another embodiment, the interpolation filter (IF) index may be replaced by an interpolation filter (IF) set index, the IF set index indicates a switchable IF set among a plurality of sets of the IFs. In an example, each IF set includes interpolation filters for each fractional position. Meanwhile, IFs for the same fractional positions can be equal among a few IF sets. For example, there are same filters for some fractional positions and different filters for some fractional positions among the plurality of sets of the IFs, particularly, the IF for a respective fractional position can be switched according to the IF set index. In some cases, the switching between two sets of interpolation filters may be understood as switching between two interpolation filters.

In one embodiment, the half-pixel interpolation filter index indicates a half-pixel interpolation filter among a set of half-pixel interpolation filters, and wherein the half-pixel interpolation filter is used for interpolating a half-pixel value only when at least one of the one or more motion vectors points to a half-pixel position; If L0 and/or L1 motion vector points to half-pixel (half-pel) position, an interpolation filter is selected according to the half-pixel interpolation filter index and used for sample interpolation during the motion compensation for the corresponding prediction list (prediction direction) (L0 and/or L1).

It can be noted that the block and the N preceding blocks may be within a slice of a frame, or may be are within a frame. In an example, the history-based motion information candidate list (table) is emptied when a new slice is encountered. The construction process is invoked when a new slice is encountered. In another example, the HMI list/table may be reset on each new CTU row inside the slice.

It can be understood that N preceding blocks may be one or more preceding blocks. The preceding blocks refer to the previously encoded or decoded block preceding the present block in the encoding or decoding order. In an example, a block P may use an HMVP table including one or more coded/decoded blocks preceding the block P. The HMVP table is updated after derivation of motion information of the block P. After the HMVP table is updated, a block Q following the block P may use the updated HMVP table. The block Q is encoded or decoded following the block P in the decoding or encoding order.

It can be understood that after updating the HMVP list, there may be M history-based motion information candidates in the updated HMVP list, and M is smaller than or equal to a predefined number (such as 5) and M>=N.

It can be further understood that if the index of the HMI list starts from 1, the HMI list is an ordered list of N history-based motion information candidates $H_k$, k=1, . . . , N, associated with motion information of a plurality of preceding blocks preceding a block.

Thus, an improved method is provided allowing for the inheritance of the interpolation filter index in the history-based motion information candidate list. In particular, the interpolation filter (IF) index of a preceding block is stored in the corresponding history-based motion information candidate in the history-based motion information candidate list. When the history-based motion information candidate list is directly or indirectly used for inter prediction of a block coded in a merge or skip mode, the interpolation filter (IF) index can be borrowed from the corresponding motion information candidate without using a separate syntax element. Propagating the IF index through the history-based motion information candidate list allows proper interpolation filter to be used (instead of using the predefined one) for the block which ensures the quality of the coded signal. As a result, the technology presented herein provides an advantage of improving the coding efficiency, and thus the overall compression performance of the video coding method.

It is noted that the term "block", "coding block" or "image block" used in the present disclosure can include transform units (TUs), prediction units (PUs), coding units (CUs), etc. In Versatile video coding (VVC), transform units and coding units are mostly aligned except in a few scenarios when TU tiling or sub block transform (SBT) is used. It can be understood that the terms "block", "image block", "coding block" and "picture block" may be used interchangeably herein. The terms "sample" and "pixel" may also be used interchangeably in the present disclosure. The terms "prediction sample value" and "prediction pixel values" may be used interchangeably in the present disclosure. The terms "sample location" and "pixel location" may be used interchangeably in the present disclosure.

It should be further understood that the terms "history-based motion information candidate list," "HMI list," "HMVP list," "HMVP table," and "HMVP LUT" may be used interchangeably in the present disclosure.

It should be understood that the HMVP list is constructed using motion information of one or more coded/decoded preceding blocks. The HMVP list is used to store motion information from neighboring blocks (but not necessarily from the adjacent blocks like regular spatial merge candidates). The idea of HMVP is to use motion information from the preceding blocks that are spatially close to a block, but not necessarily adjacent to the block (blocks from some spatial neighborhood).

In an embodiment, the updating the HMI list comprises: adding the motion information of the block as a history-based motion information candidate $H_k$, k=N to the HMI list, if at least one of the following elements of each history-based motion information candidate of the HMI list differs from a corresponding element of the motion information of the block;

i) the one or more motion vectors, MVs, and, ii) the one or more reference picture indices corresponding to the MVs.

It can be understood that if the index of the HMI list starts from 1, the adding may refer to adding a history-based motion information candidate $H_k$, k=N+1 containing the motion information of the block to the HMI list.

It is allowed to add the motion information of the block as a history-based motion information candidate in the last position of the HMI list.

In an embodiment, the updating the HMI list comprises:

removing a history-based motion information candidate from the HMI list and adding the motion information of the block as a history-based motion information candidates $H_k$, k=N−1 to the HMI list, if as a result of comparing the following elements of the history-based motion information candidate of the HMI list same with the corresponding elements of the motion information of the block;

i) one or more motion vectors, MVs, and, ii) one or more reference picture indices corresponding to the MVs.

It can be understood that if the index of the HMI list starts from 1, the adding may refer to adding the motion information of the block as a history-based motion information candidate $H_k$, k=N to the HMI list.

The motion information of the block can be added as a history-based motion information candidate in the last position of the HMI list.

In a possible implementation form of the method according to any preceding implementation of the first aspect or the first aspect as such, the updating the HMI list comprises:

removing a history-based motion information candidate $H_k$, k=0 from the HMI list and adding the motion information of the block as a history-based motion information candidate $H_k$, k=N−1 to the HMI list, if N is equal to a predefined number.

It can be understood that if the index of the HMI list starts from 1, the removing may refer to removing a history-based motion information candidate $H_k$, k=1 from the HMI list, and the adding refers to adding the motion information of the block as a history-based motion information candidate $H_k$, k=N to the HMI list.

It is allowed to remove a history-based motion information candidate in the first position of the HMI list and adding the motion information of the block as a history-based motion information candidate in the last position of the HMI list.

In an embodiment, the method further comprises:

comparing whether motion vectors of any history-based motion information candidate are same with the corresponding motion vectors of the block, and comparing whether reference picture indices of any history-based motion information candidate are same with the corresponding reference picture indices of the block.

In an embodiment, the method further comprises:

comparing whether at least one of the motion vectors of each history-based motion information candidate (e.g., HMVP candidate) are different from the corresponding motion vector of the block, and comparing whether at least one of the reference picture indices of each HMVP candidate is different from the corresponding reference picture index of the block.

It is thus allowed to use only MVs and reference picture indices in a pruning process while updating the HMVP table without comparing the interpolation filter index. Thus a good trade-off between the complexity and the diversity of HMVP candidates may be achieved. In particular, allowing comparison based on only MVs and reference picture indices can avoid additional computational operations or reduce the computational complexity. Each comparison operation will incur additional computation during HMVP table updating and merge candidate construction processes. So, if comparison operations can be reduced or eliminated, the computational complexity can be reduced thereby increasing the coding efficiency. In addition, allowing comparison based on only MVs and reference picture indices can preserve HMVP records diversity. It is inefficient to have two HMVP records having the same MVs and reference indices and differing only in their IF indices because these two records are not sufficiently different. As such, during the HMVP table update process, it is reasonable to consider these two HMVP records to be the same. In this case, a new record, that differs from the existing record only in the IF index, would not be added to the HMVP table. As a result, "old"/existing record that is "sufficiently different" (having different MVs or reference indices) from the other records would be preserved. In other words, for a new record to be added to the HMVP table, this new record should be not just bitwise different from the existing records but it needs to be "substantially different." From the coding efficiency point of view, it is more efficient to have two records with different MVs or reference indices in HMVP table than two records differing only in the IF indices.

In an embodiment, the predefined number is 5 or 6.

In an embodiment, the half sample interpolation filter index included in the history-based motion information candidate indicates a half-sample interpolation filter among a set of half-sample interpolation filters, and the half-sample interpolation filter is applied for interpolating a half-sample value only when at least one of the one or more MVs of the history-based motion information candidate points to a half-sample position.

In the prior art default IF index (that corresponds to the default IF) was always used for the merge candidates obtained from the HMVP table. With the present disclosure, the IF index is propagated through the HMVP table and thus one of a set of interpolation filters can be used according to the IF index, in an example, one of two interpolation filters (the default one and the alternative one) can be used according to the IF index. Thus appropriative interpolation filter is selected instead of the default one that in turn improves the reference reliability, thus improves the quality of the prediction signal and the coding efficiency.

It is noted that the term "alternative half-pixel interpolation filter(s)", "switchable interpolation filter(s) (SIF)" or "half-pixel interpolation filter(s)" may be used interchangeably in the present disclosure.

Appropriate interpolation filter (IF) can be selected depending on the content. For regions with the sharp edges, regular DCT-based IF can be used. For smooth regions (or if preserving of the sharp edges is not needed), alternative 6-tap IF (Gauss filter) can be used. For the merge mode, this IF index is borrowed from the corresponding motion information candidate. For blocks coded in the merge mode, when the motion information candidate is obtained from the HMVP table, alternative IF can be used. Propagating the IF index through HMVP table allows the use of appropriate IF for the block. This provides an advantage of improving the coding efficiency. Without the proposed mechanism, the default IF index (corresponding to an 8-tap DCT-base IF) is always used for HMVP merge candidate(s), and the specifics of the content of the current block (whether sharp edges need to be preserved or not) can't be taken into account.

According to a second aspect, a method for inter prediction for a block in a frame of a video signal is provided, the method comprising:

- constructing a history-based motion information candidate (HMI) list, wherein the HMI list is an ordered list of N history-based motion information candidates $H_k$, k=0, . . . , N−1, associated with (or containing) motion information of a plurality of preceding blocks (e.g. N preceding blocks) preceding the block, wherein N is an integer number greater than 0, wherein each history-based motion information candidate corresponds to a preceding block and includes elements:
  - i) one or more motion vectors, MVs of the preceding block,
  - ii) one or more reference picture indices corresponding to the MVs of the preceding block, and
  - iii) an interpolation filter index (such as, an interpolation filter index of the preceding block or an interpolation filter index associated with the preceding block);
- adding one or more history-based motion information candidates from the HMI list into a motion information candidate list for the block; and
- deriving motion information for the block based on the motion information candidate list. The motion information candidate list may be a merge candidate list.

In an embodiment, according to a second aspect, a method for inter prediction for a block in a frame of a video signal is provided, the method comprising:

- constructing a history-based motion information candidate list, wherein the HMI list is an ordered list of N history-based motion information candidates $H_k$, k=0, . . . , N−1, associated with (or containing) motion information of a plurality of preceding blocks (e.g. N preceding blocks) preceding the block, wherein N is an integer number greater than 0, wherein at least one history-based motion information candidate includes elements for a corresponding preceding block comprising:
  - i) one or more motion vectors (MVs), wherein at least one of MVs points to a half-pixel position,
  - ii) one or more reference picture indices corresponding to the one or more MVs, and
  - iii) an interpolation filter index of the preceding block;
- adding one or more history-based motion information candidates from the HMI list into a motion information candidate list for the block; and
- deriving motion information for the block based on the motion information candidate list.

The motion information candidate list may be a merge candidate list.

It can be understood that history-based motion information candidates are added into a merge candidate list as history-based merging candidates.

In an embodiment, the HMI list has a length of N, and N is 5 or 6.

Thus, an improved method is provided allowing for the inheritance of the interpolation filter index in the history-based motion information candidate list. In particular, the interpolation filter (IF) index of a preceding block is stored in the corresponding history-based motion information candidate in the history-based motion information candidate list. When the history-based motion information candidate list is directly or indirectly used for inter prediction of a block coded in a merge or skip mode, the interpolation filter (IF) index can be borrowed from the corresponding motion information candidate without using a separate syntax element. Propagating the IF index through the history-based motion information candidate list allows proper interpolation filter to be used (instead of using the predefined one) for the block which ensures the quality of the coded signal. As a result, the technology presented herein provides an advantage of improving the coding efficiency, and thus the overall compression performance of the video coding method.

In an embodiment, a half-sample interpolation filter is applied only when at least one of one or more MVs of the derived motion information points to a half-sample position, wherein the half-sample interpolation filter is indicated by a half sample interpolation filter index included in the derived motion information.

In an embodiment, the half-sample interpolation filter index included in the history-based motion information candidate indicates a half-sample interpolation filter among a set of half-sample interpolation filters, wherein the half-sample interpolation filter is applied for interpolating a half-sample value only when at least one of the one or more MVs in the history-based motion information candidate points to a half-sample position.

In an embodiment, the history-based motion information candidate further includes one or more bi-prediction weight indices. The term bi-prediction weight index, bcw_idx, is referred also as generalized bi-prediction weight index, GBIdx and/or Bi-prediction with CU-level Weights (BCW) index. Alternatively, this index may be abbreviated as BWI referring simply as bi-prediction weight index.

In an embodiment, the method further comprises:

- adding the motion information of the block as a history-based motion information candidate $H_k$, k=N to the HMI list, if at least one of the following elements of each history-based motion information candidate of the HMI list differs from the corresponding element of the motion information of the block;
  - i) one or more motion vectors, MVs, and,
  - ii) one or more reference picture indices corresponding to the MVs.

In an embodiment, the method further comprises:

- removing a history-based motion information candidate from the HMI list and adding the motion information of the block as a history-based motion information candidates $H_k$, k=N−1 to the HMI list, if the following elements of the history-based motion information candidate of the HMI list same with the corresponding elements of the motion information of the block;
  - i) one or more motion vectors, MVs, and,
  - ii) one or more reference picture indices corresponding to the MVs.

In an embodiment, the method further comprises:

- removing a history-based motion information candidate $H_k$, k=0 from the HMI list and adding the motion information of the block as a history-based motion information candidate $H_k$, k=N−1 to the HMI list, if N is equal to a predefined number. In an example, the predefined number is 5.

In an embodiment, the method further comprises:

comparing whether corresponding motion vectors of any history-based motion information candidate are same with the motion vectors of the block, and comparing whether corresponding reference picture indices of any history-based motion information candidate are same with the reference picture indices of the block.

In an embodiment, the comparing comprises:

comparing whether at least one of motion vectors of each history-based motion information candidate is different from the corresponding motion vector of the block, and comparing whether at least one of the reference picture indices of each HMVP candidate is different from the corresponding reference picture index of the block.

In an embodiment, the motion information candidate list is used for a merge mode or a skip mode. In other words, the current block is coded in a merge mode or a skip mode.

In an embodiment, the deriving the motion information for the block based on the motion information candidate list comprises:

deriving the motion information referred by the candidate index from the motion information candidate list as the motion information of the current block, where the candidate index is parsed or derived from a bitstream.

In an embodiment, the method further including:

when at least one of the one or more motion vectors, MVs included in the derived motion information points to a half-pixel position, obtaining prediction sample values of the block by applying a half-pixel interpolation filter to pixels values that are pointed by the MVs and which are of the reference pictures, wherein the half-pixel interpolation filter is indicated by an interpolation filter index included in the derived motion information;

when no motion vectors, MVs included in the derived motion information points to a half-pixel position, obtaining prediction sample values of the block by applying a default interpolation filter to pixels values that are pointed by the MVs and which are of the reference pictures.

The encoding and the decoding methods defined in the claims, the description and the figures can each be performed by an encoding apparatus and a decoding apparatus, respectively.

According to a third aspect, an apparatus for construction a history-based motion information candidate list, is provided, wherein the apparatus comprising a history-based motion information candidate list obtaining unit, configured to obtain a history-based motion information candidate list, wherein the HMI list is an ordered list of N history-based motion information candidates $H_k$, k=0, . . . , N−1, associated with motion information of a plurality of blocks preceding a block, wherein N is an integer number greater than 0, wherein each history-based motion information candidate includes elements:

i) one or more motion vectors, MVs, ii) one or more reference picture indices corresponding to the MVs, and iii) an interpolation filter index;

a history-based motion information candidate list updating unit, configured to update the HMI list based on motion information of the block, wherein the motion information of the block includes elements:

i) one or more motion vectors, MVs, ii) one or more reference picture indices corresponding to the MVs, and iii) an interpolation filter index.

The method according to the first aspect can be performed by the apparatus according to the third aspect. Further features and embodiments of the apparatus according to the third aspect correspond to the features and embodiments of the apparatus according to the first aspect.

According to a fourth aspect, an apparatus for inter prediction for a block, is provided, wherein the apparatus comprising a list management unit configured to construct a history-based motion information candidate list, wherein the HMI list is an ordered list of N history-based motion information candidates $H_k$, k=0, . . . , N−1, associated with motion information of a plurality of blocks preceding the block, wherein N is an integer number greater than 0, wherein each history-based motion information candidate includes elements:

i) one or more motion vectors, MVs, ii) one or more reference picture indices corresponding to the MVs, and iii) an interpolation filter index;

the list management unit is further configured to add one or more history-based motion information candidates from the HMI list into a motion information candidate list for the block; and a motion information deriving unit configured to derive motion information for the block based on the motion information candidate list.

The method according to the second aspect can be performed by the apparatus according to the fourth aspect. Further features and embodiments of the apparatus according to the fourth aspect correspond to the features and implementation forms of the apparatus according to the second aspect.

According to a fifth aspect, an encoder is provided, where the encoder comprises processing circuitry for carrying out the method according to the first or second aspect or the embodiment thereof.

According to a sixth aspect, a decoder is provided, where the decoder comprises processing circuitry for carrying out the method according to the first or second aspect or the embodiment thereof.

According to a seventh aspect, a decoder is provided. The decoder comprises:

one or more processors; and a non-transitory computer-readable storage medium coupled to the processors and storing programming for execution by the processors, wherein the programming, when executed by the processors, configures the decoder to carry out the method according to the first or second aspect as such or the implementation form thereof.

According to an eighth aspect, an encoder is provided. The encoder comprises:

one or more processors; and a non-transitory computer-readable storage medium coupled to the processors and storing programming for execution by the processors, wherein the programming, when executed by the processors, configures the encoder to carry out the method according to the first or second aspect or the embodiment thereof.

According to a ninth aspect, a non-transitory storage medium is provided, where the non-transitory storage medium comprises a bitstream encoded/decoded by the method of any one of the preceding aspects.

An apparatus for encoding or for decoding a video stream may include a processor and a memory. The memory stores instructions that cause the processor to perform the method according to any one of the preceding aspects.

For each of the encoding or decoding methods disclosed herein, a computer-readable storage medium is proposed, the storage medium having stored thereon instructions that when executed cause one or more processors to encode or decode video data. The instructions cause the one or more processors to perform the method according to any one of the preceding aspects.

Furthermore, for each of the encoding or decoding methods disclosed herein, a computer program product is proposed. The computer program product comprises program code for performing the method according to any one of the preceding aspects.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments are described in more detail with reference to the attached figures and drawings, in which.

DETAILED DESCRIPTION OF THE EMBODIMENTS

Figure 1A:
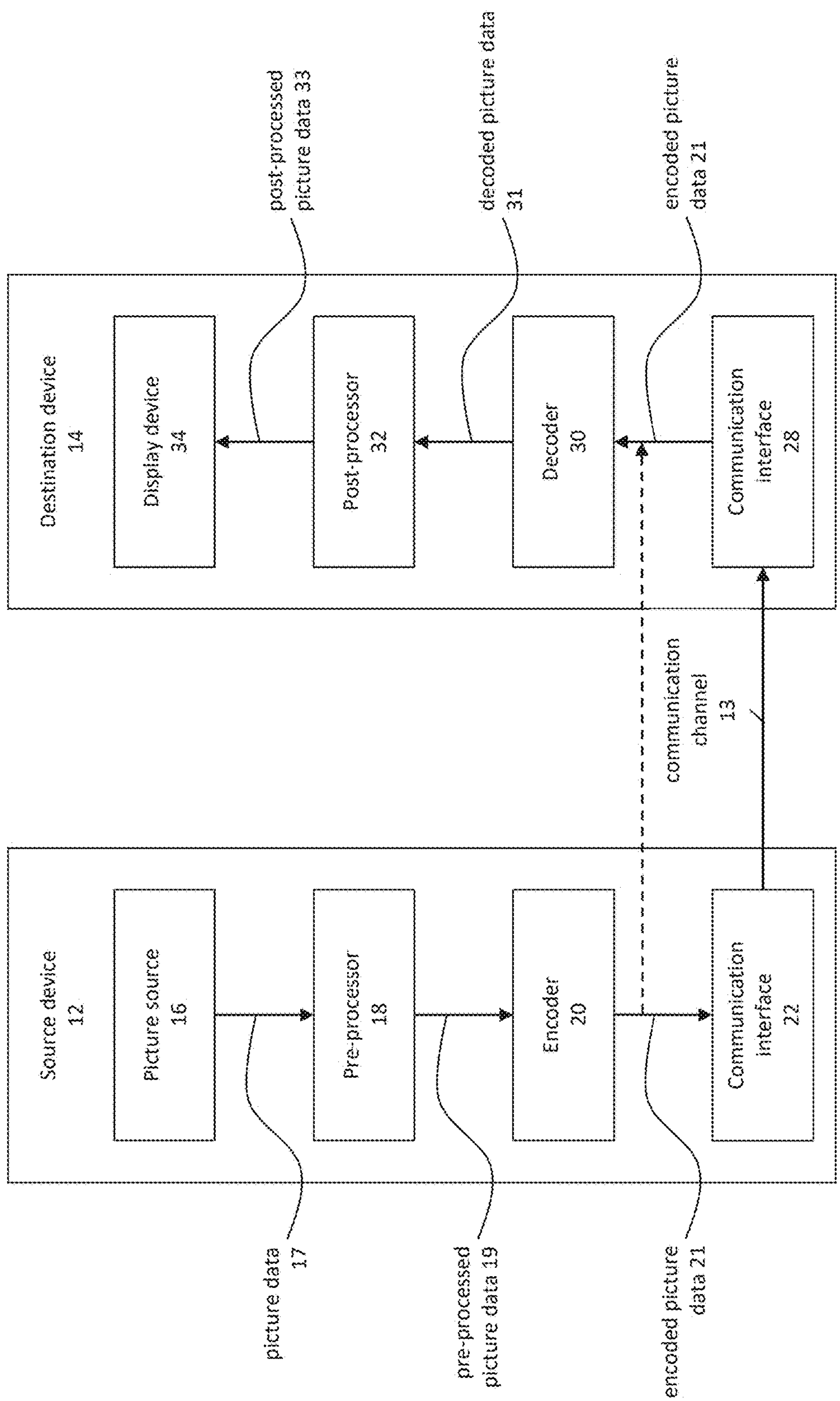
FIG. 1A is a block diagram showing an example of a video coding system according to an embodiment.

In the following description, reference is made to the accompanying figures, which form part of the disclosure, and which show, by way of illustration, specific aspects of embodiments or specific aspects in which embodiments may be used. It is understood that embodiments may be used in other aspects and comprise structural or logical changes not depicted in the figures. The following detailed description, therefore, is not to be taken in a limiting sense, and the scope of the disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) according to an embodiment. Video encoder 20 (or short encoder 20) and video decoder 30 (or short decoder 30) of video coding system 10 represent examples of devices that may be configured to perform embodiments in accordance with various examples described herein.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component in some embodiments.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
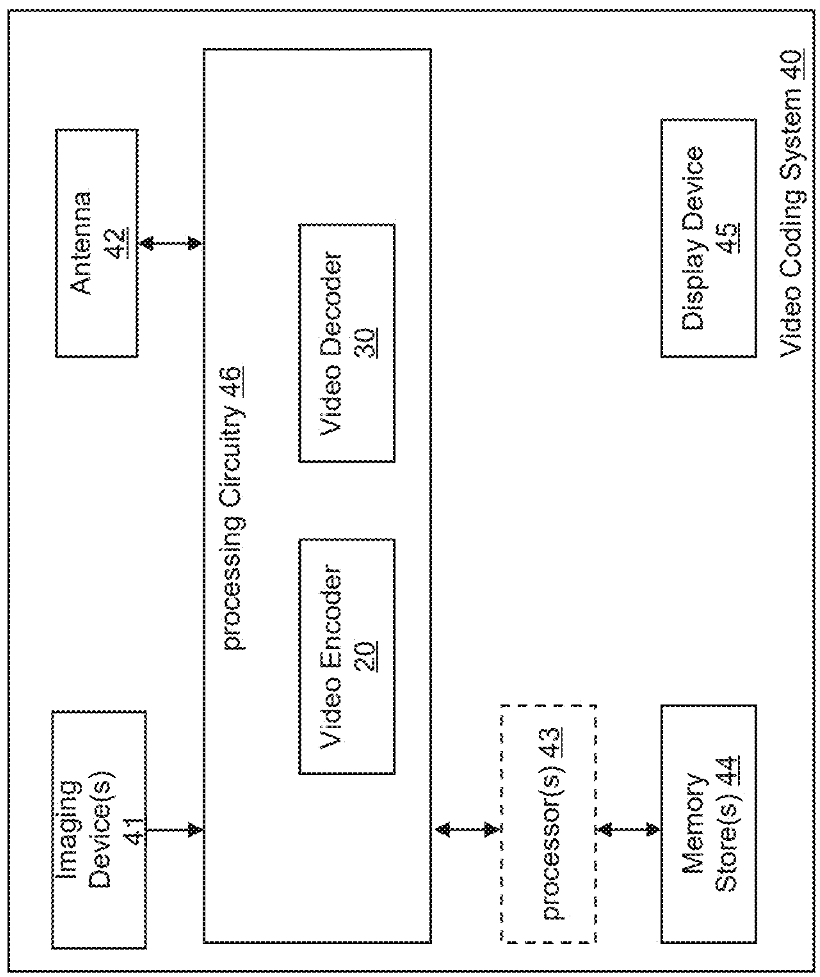
FIG. 1B is a block diagram showing another example of a video coding system according to an embodiment.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGA s), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some embodiments, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (M PEG). One of ordinary skill in the art will understand that embodiments of the disclosure are not limited to HEVC or VVC.

Encoder and Encoding Method

Figure 2:
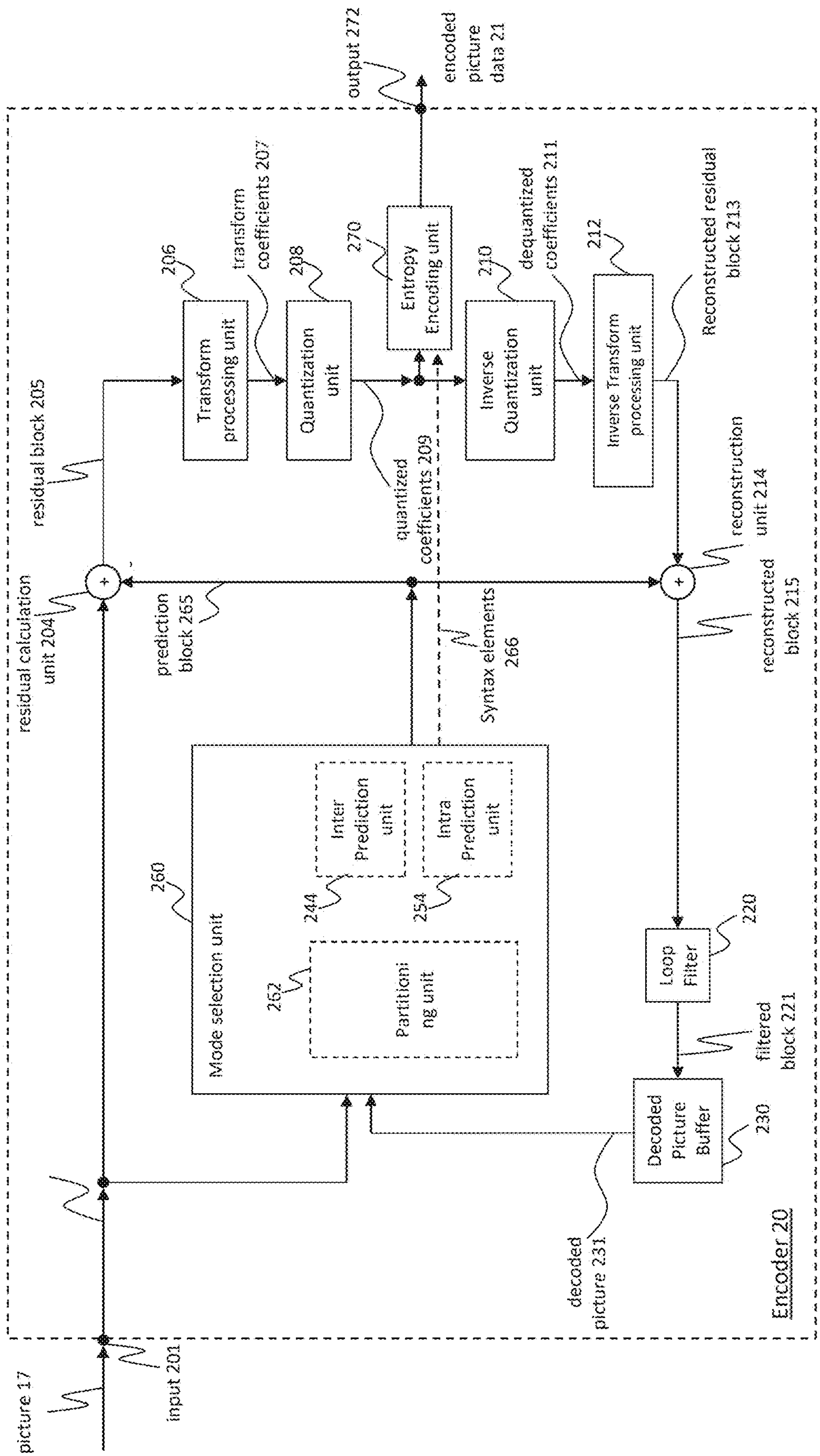
FIG. 2 is a block diagram showing an example of a video encoder according to an embodiment.

FIG. 2 shows a schematic block diagram of an example video encoder 20 according to an embodiment. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
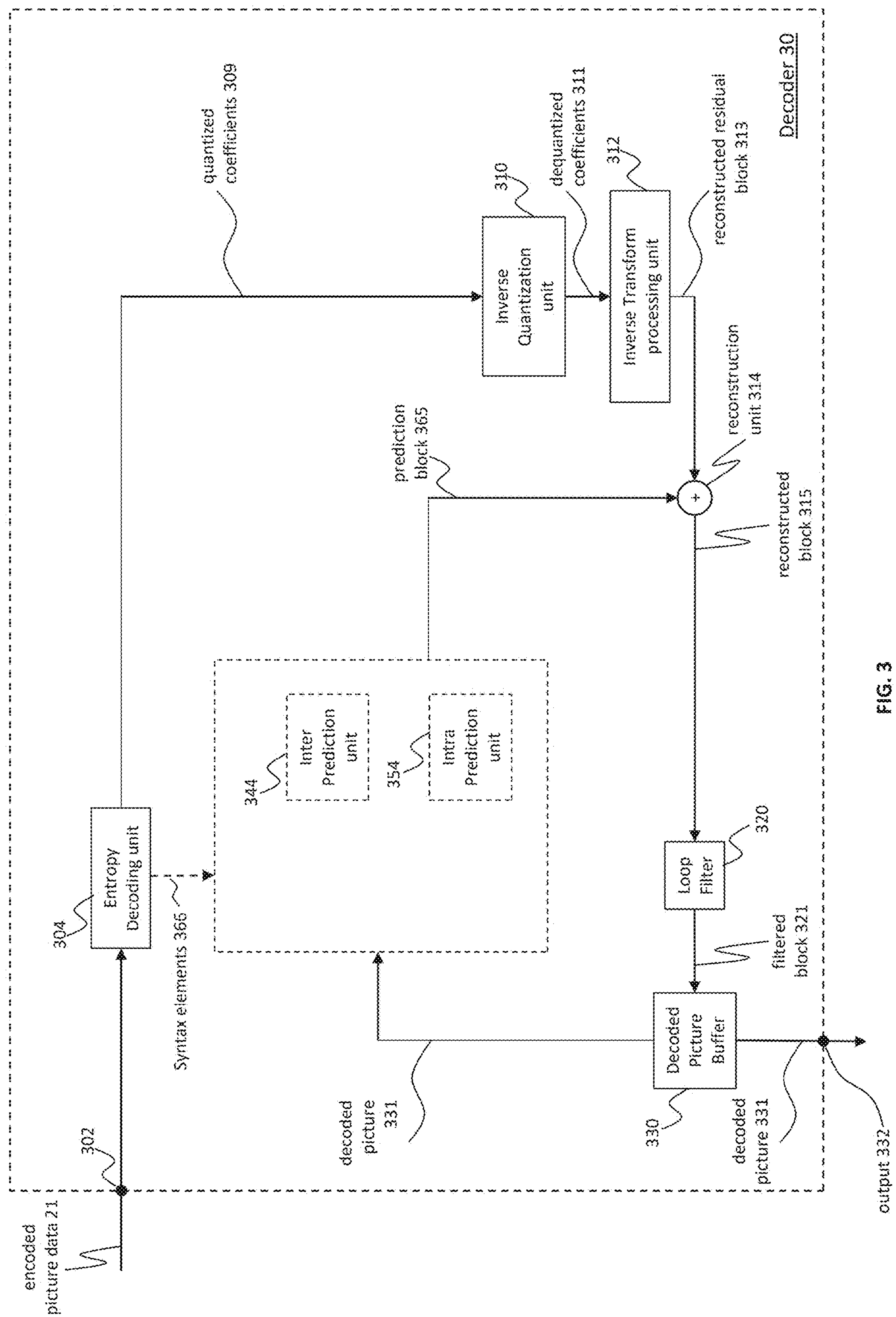
FIG. 3 is a block diagram showing an example structure of a video decoder according to an embodiment.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. As will be described below in more detail, the interpolation filtering can be performed using one or more alternative interpolation filters depending on the motion vector accuracy. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 according to an embodiment. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). M ode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is −2^(bitDepth−1)~2^(bitDepth−1)−1, where "^" means exponentiation. For example, if bitDepth is set equal to 16, the range is −32768~32767; if bitDepth is set equal to 18, the range is −131072~131071.

Figure 4:
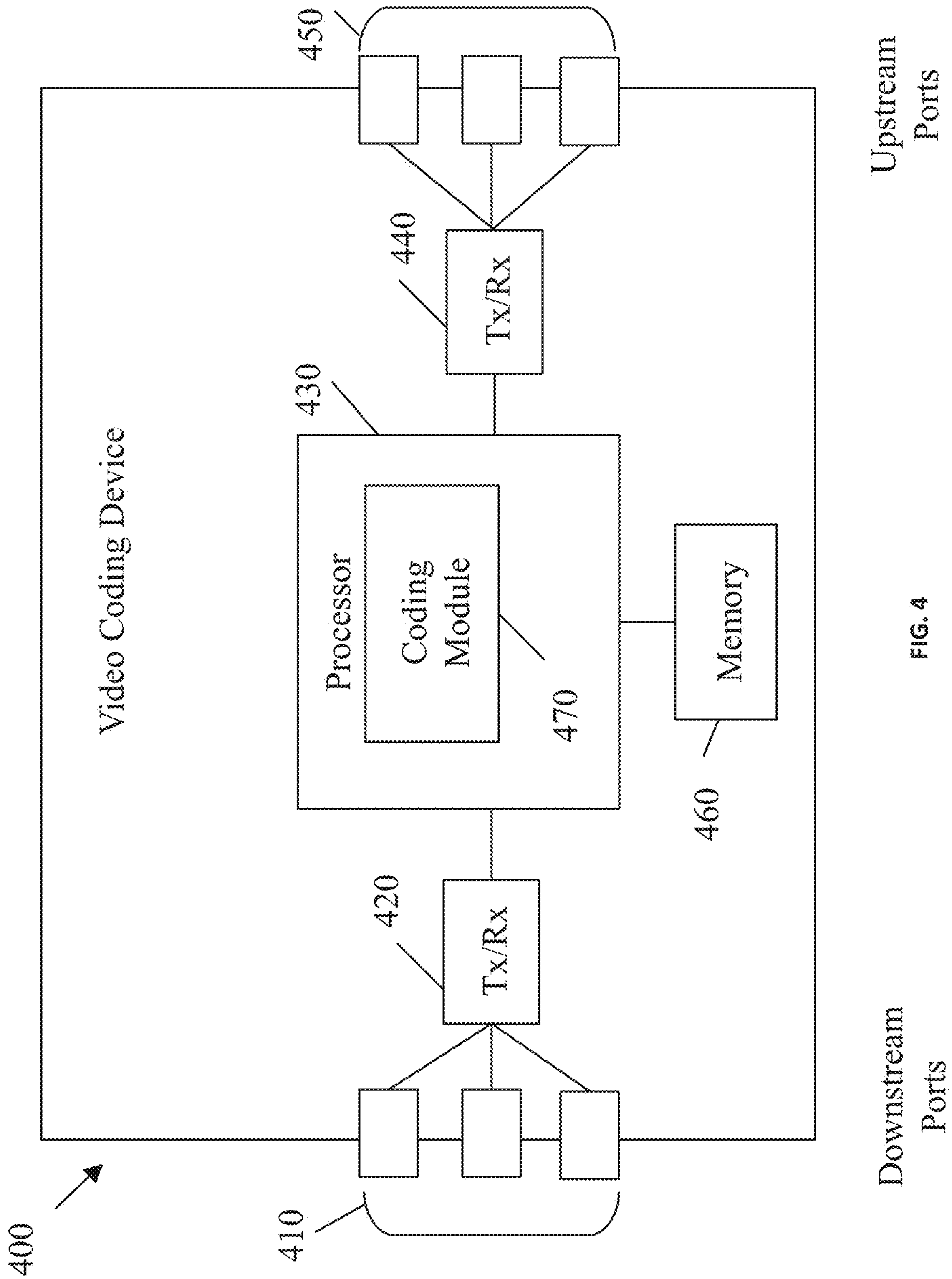
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGA s, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
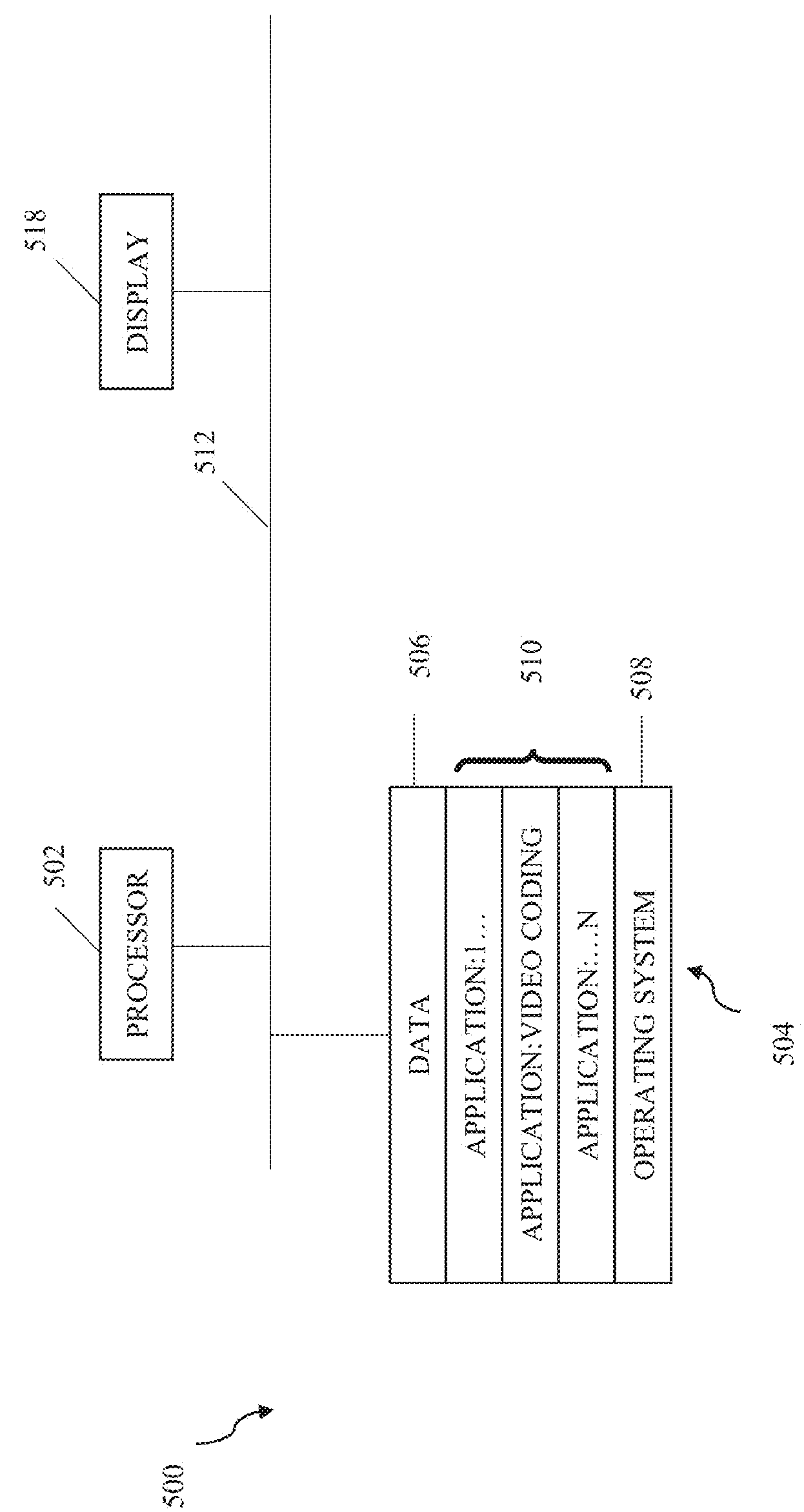
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The following describes concepts presented herein in more detail.

Motion Vector Prediction

In the current VVC design, spatial motion vector prediction is used. The spatial motion vector prediction means that during inter prediction, the motion information of the spatial neighbor blocks is used to predict the motion vector of current inter block. Specifically, in the merge and the skip mode, the motion vectors from the adjacent spatial neighbors of the current block are used. In the merge and skip modes, so-called HMVP candidates may be used. An HMVP candidate contains the motion information from a history-based spatial neighbor. "History-based" means that motion information from the blocks preceding to the current block in the decoding order is used. Such preceding blocks are from the same frame as the current block and are located in some spatial neighborhood around the current block, but not necessarily adjacent blocks like the general spatial merge candidates.

Merge Candidate List Construction

Figure 6:
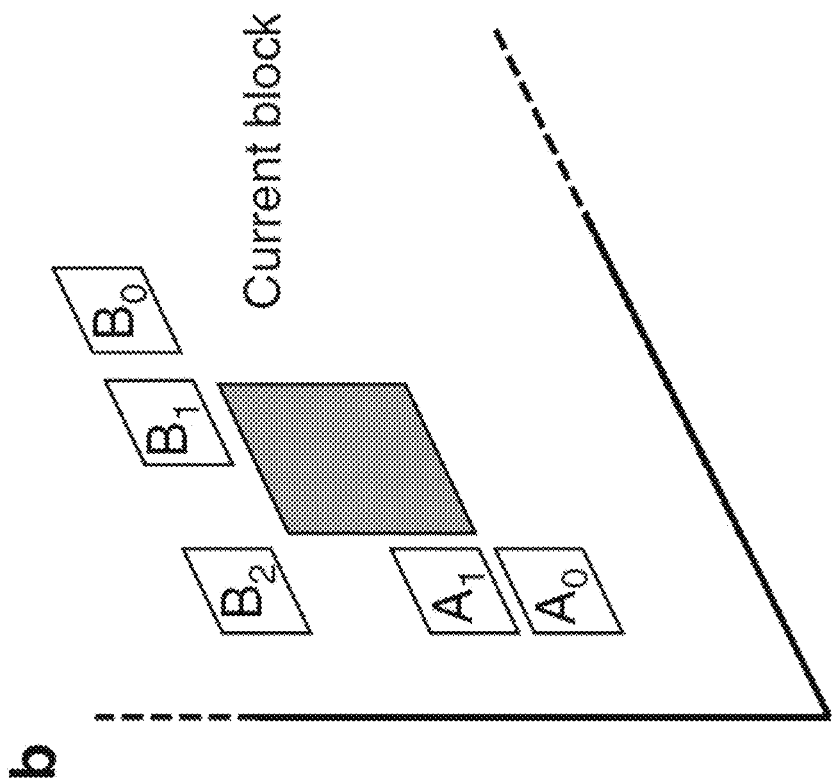
FIG. 6 schematically illustrates an example of a current block and spatial neighbors of the current block.

The merge candidate list is constructed based on the following candidates:

- up to four spatial merge candidates that are derived from five spatial neighboring blocks, as shown in FIG. 6,
- one temporal merge candidate derived from two temporal, co-located blocks,
- additional merge candidates including combined bi-predictive candidates and zero motion vector candidates. The Merge Candidate list construction will be described below in more detail, by making reference to FIG. 12.

Spatial Candidates

The first set of candidates in the merge candidate list are the spatial neighbors as illustrated in FIG. 6. For inter-prediction block merging, up to four candidates are inserted in the merge list by sequentially checking A1, B1, B0, A0 and B2, in that order. Instead of just checking whether a neighboring block is available and contains motion information, additional redundancy checks are performed before taking all the motion data of the neighboring block as a merge candidate. These redundancy checks can be divided into two categories for two different purposes:

- avoid having candidates with redundant motion data in the HMI list, and
- prevent merging two partitions that could be expressed by other means which would create redundant syntax.

History-Based Motion Vector Prediction

Figure 10:
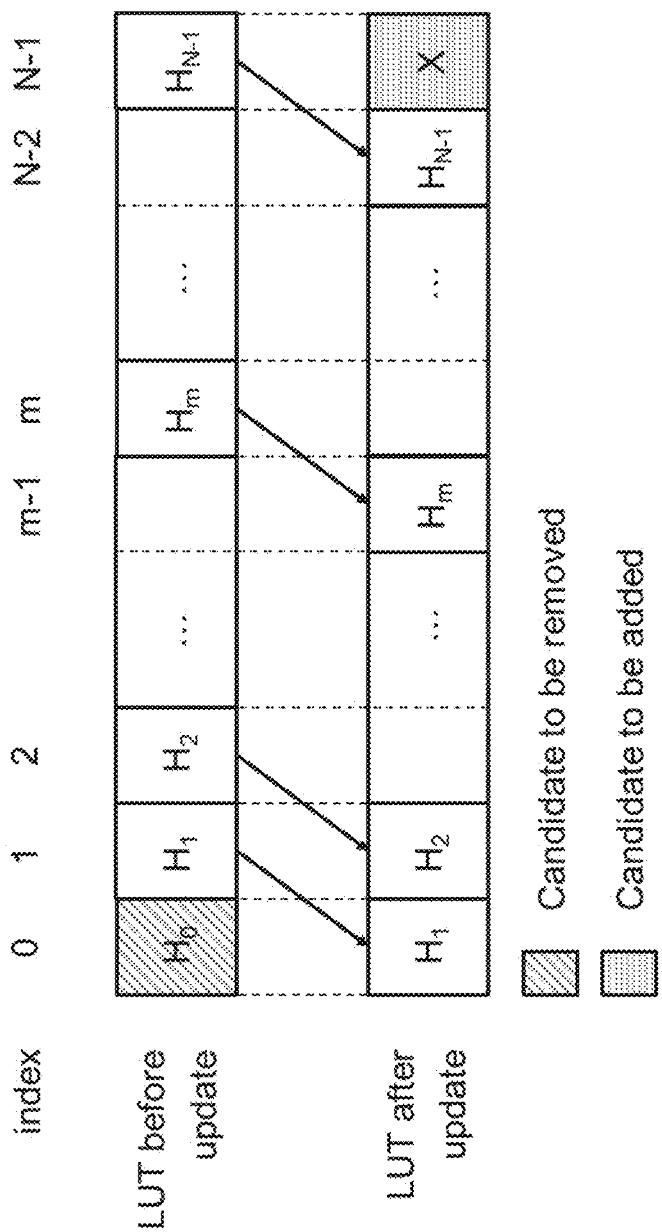
FIG. 10 schematically illustrates an example of constructing a HMVP list according to an embodiment.
Figure 11:
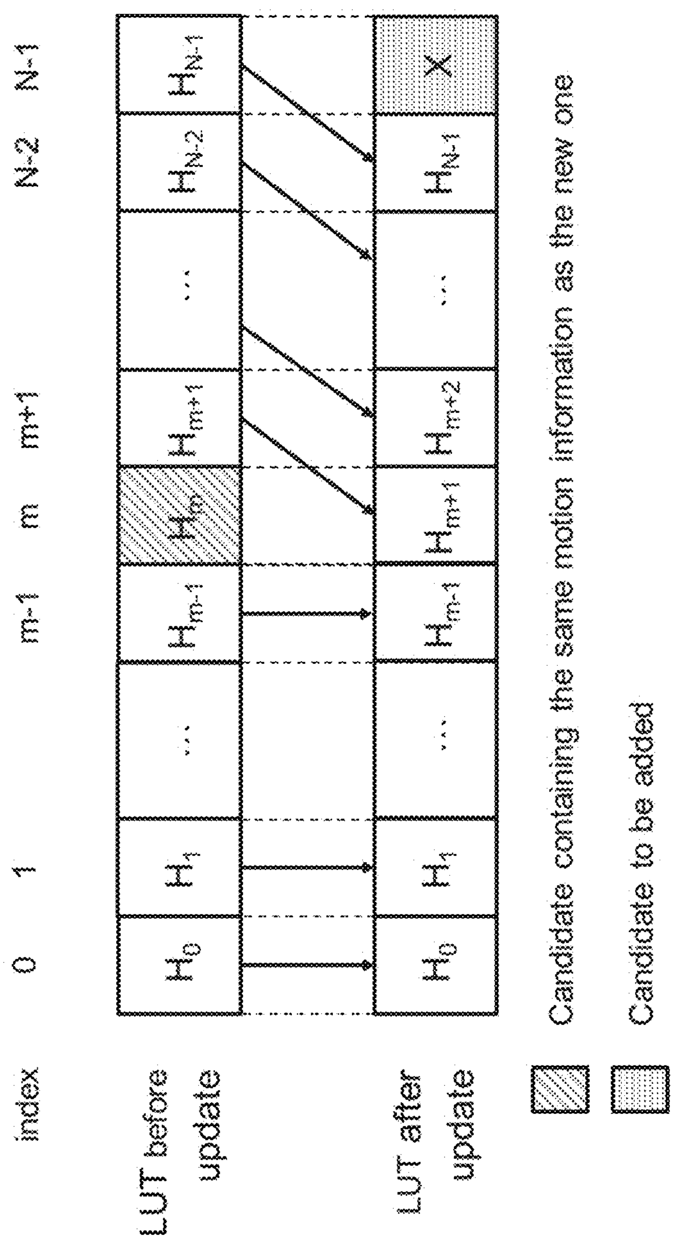
FIG. 11 schematically illustrates another example of constructing a HMVP list according to an embodiment.
Figure 12:
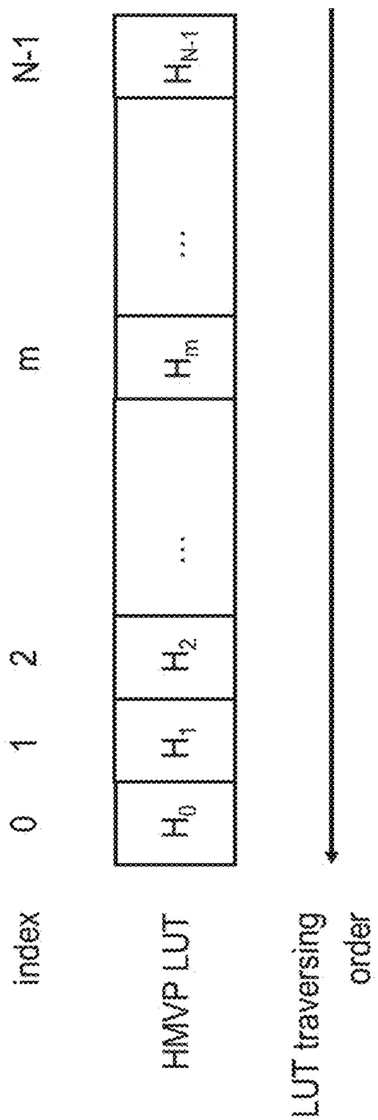
FIG. 12 illustrates an example of a HMVP list and its traversing order according to an embodiment.

For further improvement of motion vector prediction, techniques using the motion information (motion information include reference picture index/indexes and motion vector/vectors) from non-adjacent CUs were proposed. One of such techniques is history-based motion vector prediction (HMVP). HMVP uses a look-up table (LUT) comprised of motion information from previously coded CUs. Basically, the HMVP method consists of two main parts:

1. HMVP LUT construction and updating method, as shown in FIGS. 10 and 11;
2. HMVP LUT usage for constructing merge candidate list (or AMVP candidate list), as shown in FIG. 12.

HMVP LUT Construction and Updating Method

LUT is maintained during the encoding and/or decoding processes. LUT is emptied when a new slice is encountered. Whenever the current CU is inter-coded, the associated motion information is added to the last entry of the table as a new HMVP candidate. LUT size (denoted as N) is a parameter of HMVP method. If the number of HMVP candidates from the previously coded CUs is more than this LUT size, a table update method is applied, so this LUT always contains no more than N latest previously coded motion candidates. Two table update methods have been proposed:

1. First-In-First-Out (FIFO) LUT updating method as illustrated in FIG. 10;
2. Constrained FIFO LUT updating method as illustrated in FIG. 11.

FIFO LUT Updating Method

According to FIFO LUT updating method, before inserting the new candidate, the oldest candidate (0-th table entry) is removed from the table. This process is illustrated in FIG. 10. In this figure, H0 is the oldest (0-th) HMVP candidate and X is the new candidate.

This updating method has relatively small complexity, but some of the LUT elements can be the same (contain the same motion information) when this method is applied. As such, data in the LUT can be redundant and motion information diversity in the LUT is worse than the methods where duplicated candidates are removed.

Constraint FIFO LUT Updating Method

To further improve the coding efficiency, a constraint FIFO LUT updating method is introduced. According to this method, redundancy check is applied before inserting a new HMVP candidate to the table. Redundancy check means finding whether motion information from the new candidate X coincides with the motion information contained in a candidate $H_m$ already in the LUT. If such candidate $H_m$ was not found, simple FIFO method is used; otherwise the following procedure is performed:

1. All LUT entries after $H_m$ are moved one position to the left (toward the beginning of the table), so that candidate $H_m$ is removed from the table and one position at the end of LUT is released.
2. New candidate X is added to the first empty position of the table.

The example of using constraint FIFO LUT updating method is depicted in FIG. 11.

Using HMVP LUT for Motion Vector Coding

HMVP candidates can be used in the merge candidate list construction process and/or in the A MVP candidate list construction process.

Using HMVP LUT in Merge Candidate List Construction

In some examples, HMVP candidates are inserted to the merge list from the last entry to the first entry (e.g., $H_{N-1}$, $H_{N-2}$, . . . , $H_0$) after the temporal merge candidates. The LUT traversing order is depicted in FIG. 12. If HMVP candidate is equal to one of the candidates already presented in the merge list, such HMVP candidate is not added to the HMVP list. Due to the limited size of the merge list, some HMVP candidates, especially the HMVP candidates located at the beginning of LUT, also may not be used in the merge list construction process for the current CU.

Using HMVP LUT in AMVP Candidate List Construction Process

The HMVP LUT, that is constructed for the merge mode, can also be used for A MVP. The difference is, only a few entries from this LUT is used for AMVP candidate list construction. More specifically, only the last M entries of the HMVP LUT are used (e.g., M is equal to 4). During the AMVP candidate list construction process, HMVP candidates are inserted to the A MVP candidate list after the TMVP candidates from the last to the (N-K)-th entry, i.e., HN-1, HN-2, . . . , HN-K. LUT traversing order is depicted in FIG. 12.

Only HMVP candidates with the same reference picture as the A MVP target reference picture are used. If an HMVP candidate is equal to one of the candidates already presented in the HMI list, this HMVP candidate is not used for the A MVP candidate list construction. Due to the limited size of the AMVP candidate list size, some HMVP candidates may not be used in the AMVP list construction process for current CU.

Switchable Interpolation Filters

The motion vector differences of translational inter-predicted blocks can be encoded in 3 different accuracies (i.e., quarter-pel, full-pel, and 4-pel). The interpolation filters (IF) that are used for each fractional position are fixed. In the present disclosure, switchable interpolation filter (SIF) technique allows usage of one or two alternative luma interpolation filters for the half-pel position. The switching between the available luma interpolation filters can be done at the CU level. In order to reduce the signaling overhead, the switching is dependent on the used motion vector accuracy. For that purpose, the Adaptive Motion Vector Resolution (AMVR) scheme is extended to also support half-pel luma motion vector accuracy. Only in the case of this half-pel motion vector accuracy mode, an alternative half-pel interpolation filter can be used and it is indicated by an additional syntax element indicating which interpolation filter is used. In the skip or merge mode with a spatial merging candidate, the value of this syntax element may be inherited from a neighbouring block.

Half-Pel AMVR Mode

An additional AMVR mode for non-affine non-merge inter-coded CUs is introduced which allows signaling of motion vector differences at half-pel accuracy. The existing AMVR scheme of the current VVC draft is extended straightforward in the following way: Directly following the syntax element amvr_flag, if amvr_flag==1, there is a new context-modeled binary syntax element hpel_amvr_flag which indicates usage of the new half-pel AMVR mode if hpel_amvr_flag==1. Otherwise, i.e. if hpel_amvr_flag==0, the selection between full-pel and 4-pel AMVR mode is indicated by the syntax element amvr_precision_flag as in the current VVC draft.

Alternative Luma Half-Pel Interpolation Filters

For a non-affine non-merge inter-coded CU which uses a half-pel motion vector accuracy (i.e., the half-pel AMVR mode), a switching between the HEVC/VVC half-pel luma interpolation filter and one or more alternative half-pel interpolation can be made based on the value of a new syntax element if_idx (interpolation filter index). The syntax element if_idx is only signaled in case of the half-pel AMVR mode. In case of skip/merge mode using a spatial merging candidate, the value of the interpolation filter index is inherited from a neighbouring block.

It can be understood that, the fractional position of the motion vector may be represented by, for example, a luma location in fractional-sample units (xFracL, yFracL). The motion vector of the selected merge candidate may be represented by refMvLX[0] and refMvLX[1], wherein mvLX=mvL0 or mvL1.

In example, $$xFrac_L = refMvLX[0]\ \&15 \quad (8\text{-}738)$$

$$yFrac_L = refMvLX[1]\ \&15 \quad (8\text{-}739)$$

If $xFrac_L$ (or $yFrac_L$) is equal to zero (that means MV points to the integer position), interpolation is not used. Otherwise ($xFrac_L$ is within the range [1, 15]), the interpolation filter with the coefficients specified in fL[xFracL] is used. The luma interpolation filter coefficients fL[p] for each fractional sample position p (p is within the range [1, 15]) are specified in Table 8-8.

This table 8-8 is an example of interpolation filter set, and according to the fractional position, one interpolation filter is selected. One interpolation filter (the interpolation filter coefficients) may be one line in this table 8-8. In an example, the interpolation filter sets in the present disclosure may have the same interpolation filters for all positions except the half-sample position (fractional position: ½).

Table 8-8 below shows the HEVC/VVC interpolation filter coefficients fL[p] for each fractional sample position p (p is within the range [1, 15], accuracy is 1/16 pel (pixel)). In this table, when p=8, the interpolation filter coefficients $f_L[p]$ are the half-pel interpolation filter coefficients. As discussed above, additional interpolation filter(s) can be added as alternatives to this half-pel interpolation filter to allow a switching between these half-pel interpolation filters. Some examples of the alternative half-pel interpolation filters are presented in the following.

TABLE 8-8

Specification of the luma interpolation filter coefficients

| Fractional sample position p | interpolation filter coefficients $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
|---|---|---|---|---|---|---|---|---|
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Implementation with One Alternative 6-Tap Half-Pel Interpolation Filter

In an example, a 6-tap interpolation filter can be used as an alternative to the ordinary HEVC/VVC half-pel interpolation filter shown in Table 8-8. The following table 1 shows the mapping between the value of the syntax element if_idx (or the derived IF index) and the selected half-pel luma interpolation filter:

TABLE 1

| if_idx | Binarization | Filter | Interpolation filter coefficients |
|---|---|---|---|
| 0 | 0 | Gauss (6-tap) | [0, 3, 9, 20, 20, 9, 3, 0] |
| 1 | 1 | HEVC/VVC (8-tap) | [−1, 4, −11, 40, 40, −11, 4, −1] |

Implementation with Two Alternative 8-Tap Half-Pel Interpolation Filters

In another example, two 8-tap interpolation filters can be used as alternatives to the ordinary HEVC/VVC half-pel interpolation filter shown in Table 8-8. The following table 2 shows the mapping between the value of the syntax element if_idx and the selected half-pel luma interpolation filter:

TABLE 2

| if_idx | Binarization | Filter | Interpolation filter coefficients |
|---|---|---|---|
| 0 | 0 | Filter 1 (8-tap) | [3, 6, 10, 13, 13, 10, 6, 3] |
| 1 | 10 | Filter 2 (8-tap) | [−1, −1, 9, 25, 25, 9, −1, −1] |
| 2 | 11 | HEVC/VVC (8-tap) | [−1, 4, −11, 40, 40, −11, 4, −1] |

Implementation with Two Alternative 6-Tap Half-Pel Interpolation Filters

In another example, two 6-tap interpolation filters can be used as alternatives to the ordinary HEVC/VVC half-pel interpolation filter shown in Table 8-8. The following table 3 shows the mapping between the value of the syntax element if_idx and the selected half-pel luma interpolation filter:

TABLE 3

| if_idx | Binarization | Filter | Interpolation filter coefficients |
|---|---|---|---|
| 0 | 0 | Gauss | [0, 3, 9, 20, 20, 9, 3, 0] |
| 1 | 10 | Flat top | [0, −3, 4, 31, 31, 4, −3, 0] |
| 2 | 11 | HEVC/VVC (8-tap) | [−1, 4, −11, 40, 40, −11, 4, −1] |

As shown in the table 4 of interpolation filters, the interpolation filters for half-pel positions (see lines "8" in this table 4) can be switched in the present disclosure. An alternative or switchable half-sample interpolation filter is used for interpolating a half-sample value when the corresponding MV(s) points to a half-sample position in the present disclosure.

TABLE 4

Specification of the luma interpolation filter coefficients $f_L$[ p ] for each 1/16 fractional sample position p

| Fractional sample position p | interpolation filter coefficients | | | | | | | |
|---|---|---|---|---|---|---|---|---|
| | $f_L$[ p ][ 0 ] | $f_L$[ p ][ 1 ] | $f_L$[ p ][ 2 ] | $f_L$[ p ][ 3 ] | $f_L$[ p ][ 4 ] | $f_L$[ p ][ 5 ] | $f_L$[ p ][ 6 ] | $f_L$[ p ][ 7 ] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

In an embodiment, the following aspects are described:

1. A modification of history-based motion information candidate list (namely HMI list) construction/updating method. In addition to motion information of one or more coded/decoded blocks preceding a block, an interpolation filter (IF) index (e.g., a half-pel interpolation filter index (hpelIfIdx)) of the preceding block is stored in the HMI list. In particular, the IF index is also stored in HMI candidates or records of the HMI list. In this way, the IF index can be propagated through the HMI list, achieving coding consistency and higher coding efficiency.
2. An interpolation filter index (half-pel interpolation filter index) derivation procedure for merge mode: if a block has a merge candidate index corresponding to a history-based candidate, the IF index (half-pel interpolation filter index) of this history-based candidate is used for the current block.
3. SIF index propagation across the CTU boundaries. Based on the current SIF design, when the SIF technique is applied in a mode which inherits motion information from the top spatial neighbor, the line memory will be increased if the current block is located at the top border of the CTU. In the description presented herein, the location of the current block is checked. If the current block is located at the top border of the CTU, when inheriting the motion information from the top left (B0), top (B1) top-right (B2) neighbor blocks, the IF index is not inheriting but instead uses the default value to reduce the line memory cost.

Figure 7:
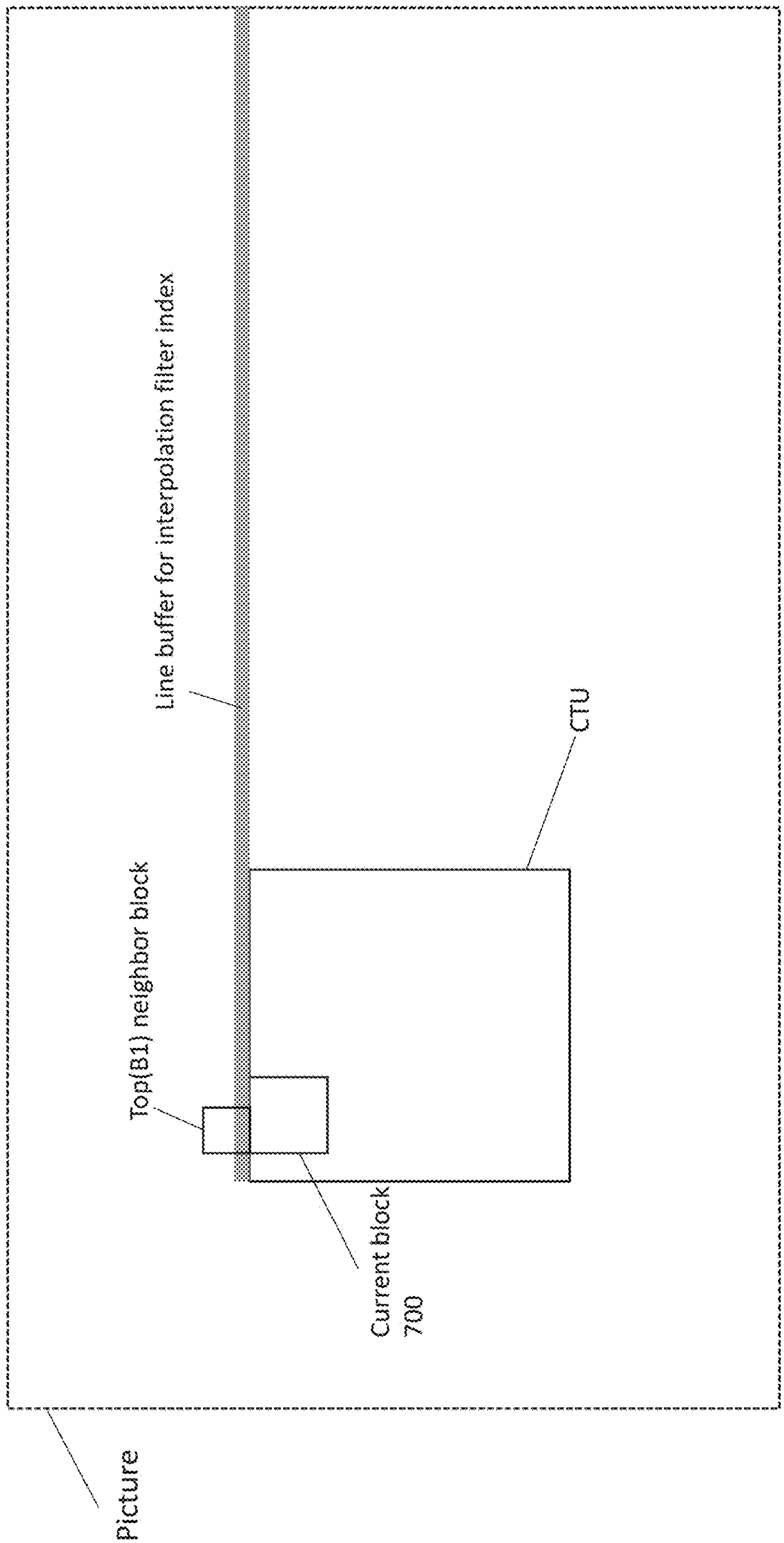
FIG. 7 schematically illustrates a current block and a top neighbor block.

The example of SIF index propagation across the CTU boundaries is depicted in FIG. 7. In this example motion information is inherited from the B1 (top) neighbor that belongs to the CTU that is not the same as the CTU enclosing the current block 700. In this case SIF index of the B1 block have to be stored in the line buffer in the prior art. The present disclosure prevents SIF index propagation in such cases and thus reduce the line buffer size requirements. During the merge list construction, location of current block is checked. If the current block is located at the top border of the CTU, during inheriting the motion information from the top left (B0), top (B1) top-right (B2) neighbor blocks, the IF index is not inheriting but use the default value to reduce the line memory cost, as shown in FIG. 7. The details will be described as below by reference to FIGS. 8 and 9.

Figure 13A:
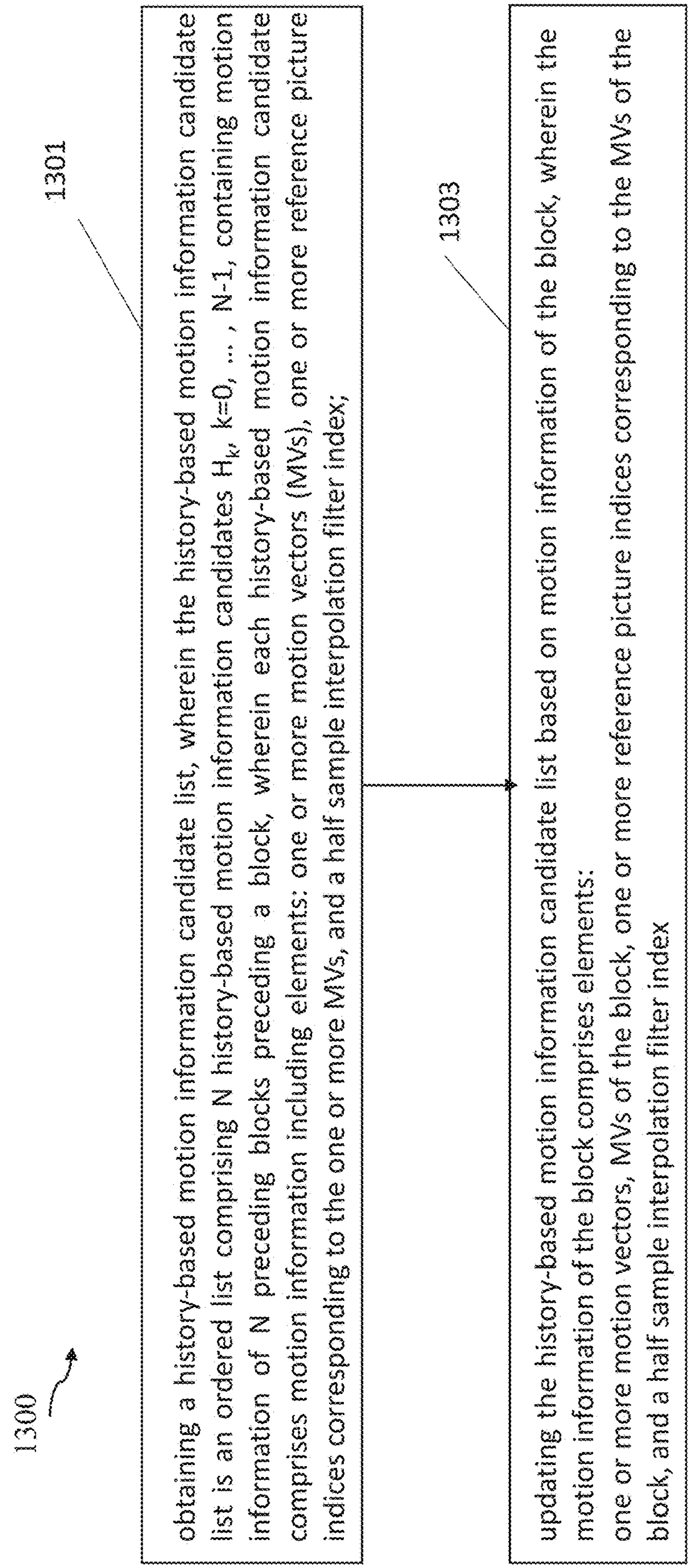
FIG. 13A is a flowchart showing an example of the HMVP list constructing method.

FIG. 13A shows a flowchart of the construction method 1300 for a history-based motion information candidate list (namely HMI list), the method comprising the operations:

In operation 1301, obtaining a history-based motion information candidate list, wherein the HMI list is an ordered list of N history-based motion information candidates Hk, k=0, . . . , N−1, associated with (containing) motion information of N preceding blocks preceding a block, wherein N is an integer number greater than 0, wherein each history-based motion information candidate includes elements:

i) one or more motion vectors, MVs of a preceding block, ii) one or more reference picture indices corresponding to the MVs of the preceding block, and iii) an interpolation filter index of the preceding block;

In operation 1303, updating the HMI list based on motion information of the block, wherein the motion information of the block includes elements:

i) one or more motion vectors, MVs of the block, ii) one or more reference picture indices corresponding to the MVs of the block, and iii) an interpolation filter index of the block.

It can be noted that one or more MVs of the block refer to MVs corresponding to L0 and L1 reference picture lists. The same for reference picture indices.

Figure 13B:
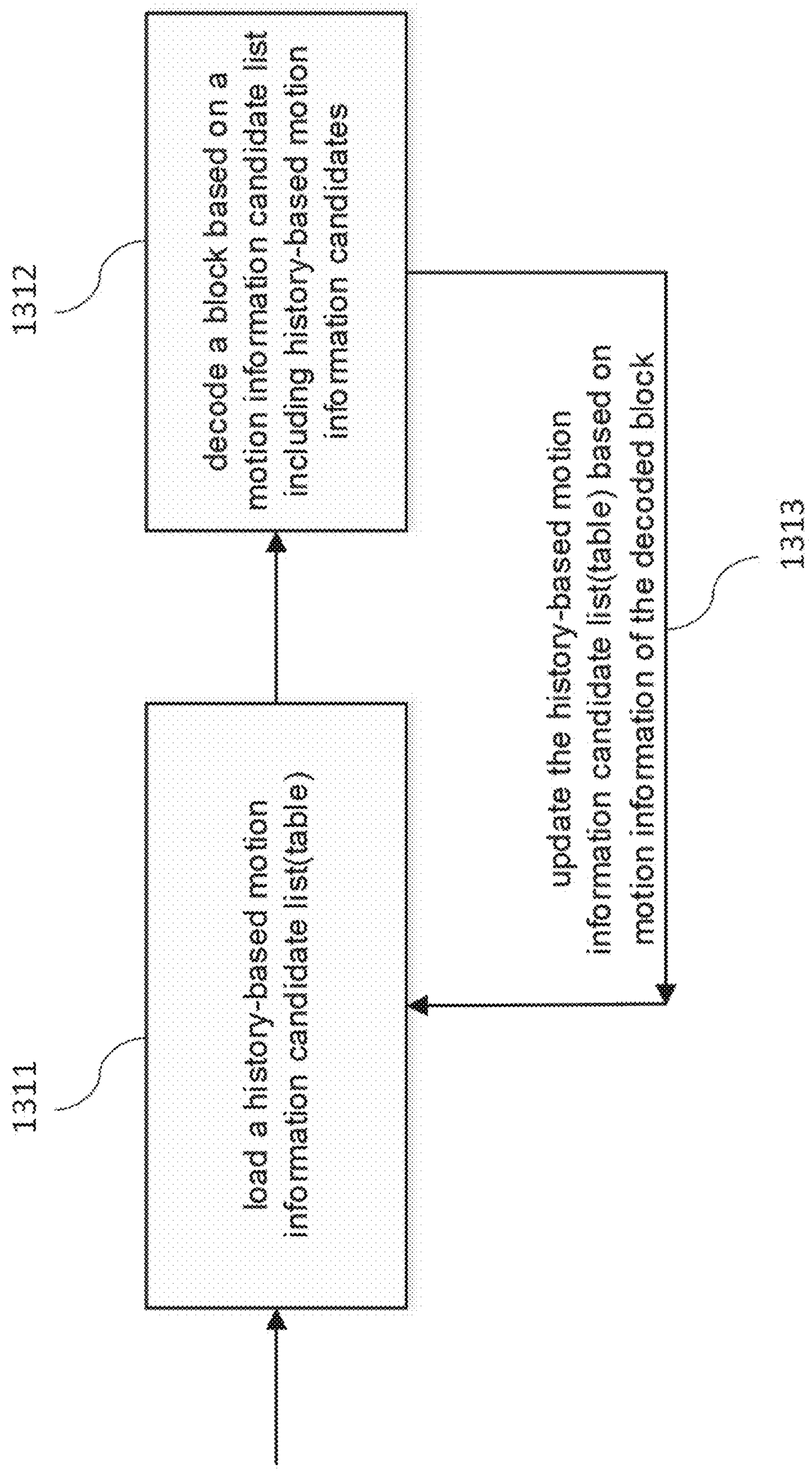
FIG. 13B is a flowchart showing another example of the HMVP list constructing method.

As illustrated in FIG. 13B, the operation 1301 may be operation 1311 involving loading a history-based motion information candidate list (HMI table), the operation 1303 may be operation 1313 involving updating the history-based motion information candidate list (table) using motion information of the decoded block. The HMI table with multiple HMVP candidates is maintained during the encoding/decoding process. The table is emptied when a new slice is encountered. When there is an inter-coded block of the slice, the block is decoded based on a motion information candidate list including history-based motion information candidates (operation 1302), and the associated motion information of the block is added to the last entry of the table as a new HMVP candidate (operation 1303).

Figure 14:
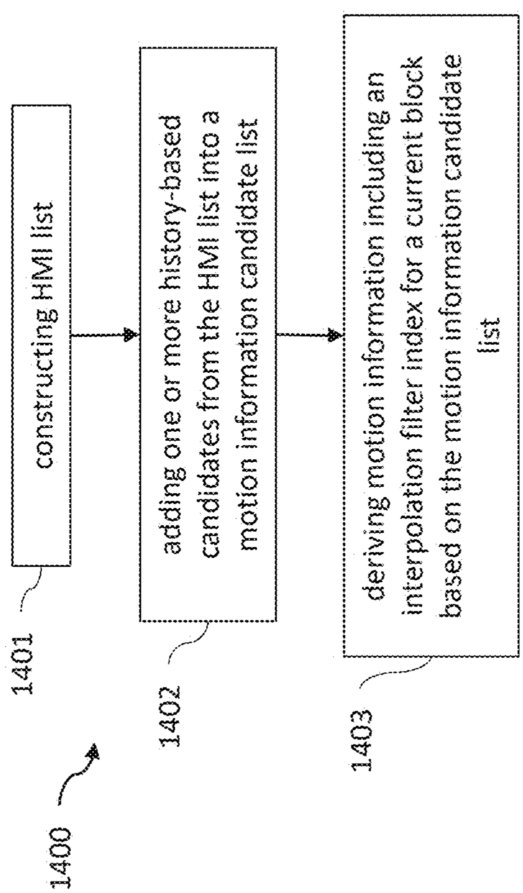
FIG. 14 is a flowchart showing an example of a method for inter prediction for a block in a frame of a video signal.

FIG. 14 shows a flowchart of a method for inter prediction for a block in a frame of a video signal, the method comprising the operations: In operation 1401, constructing a history-based motion information candidate list (namely HMVP list), wherein the HMI list is an ordered list of N history-based motion information candidates $H_k$, k=0, . . . , N−1, associated with motion information of a plurality of blocks preceding the block, wherein N is an integer number greater than 0, wherein each history-based motion information candidate includes elements:

i) one or more motion vectors, MVs, ii) one or more reference picture indices corresponding to the MVs, and iii) an interpolation filter index;

In operation 1402, adding one or more history-based motion information candidates from the HMI list into a motion information candidate list for the block; and In operation 1403, deriving motion information for the block based on the motion information candidate list.

It can be understood that the motion information candidate list refers to the merge candidate list as below.

It can be understood that the history-based merging candidates are included in the motion information candidate list in operation 1403.

Figure 15:
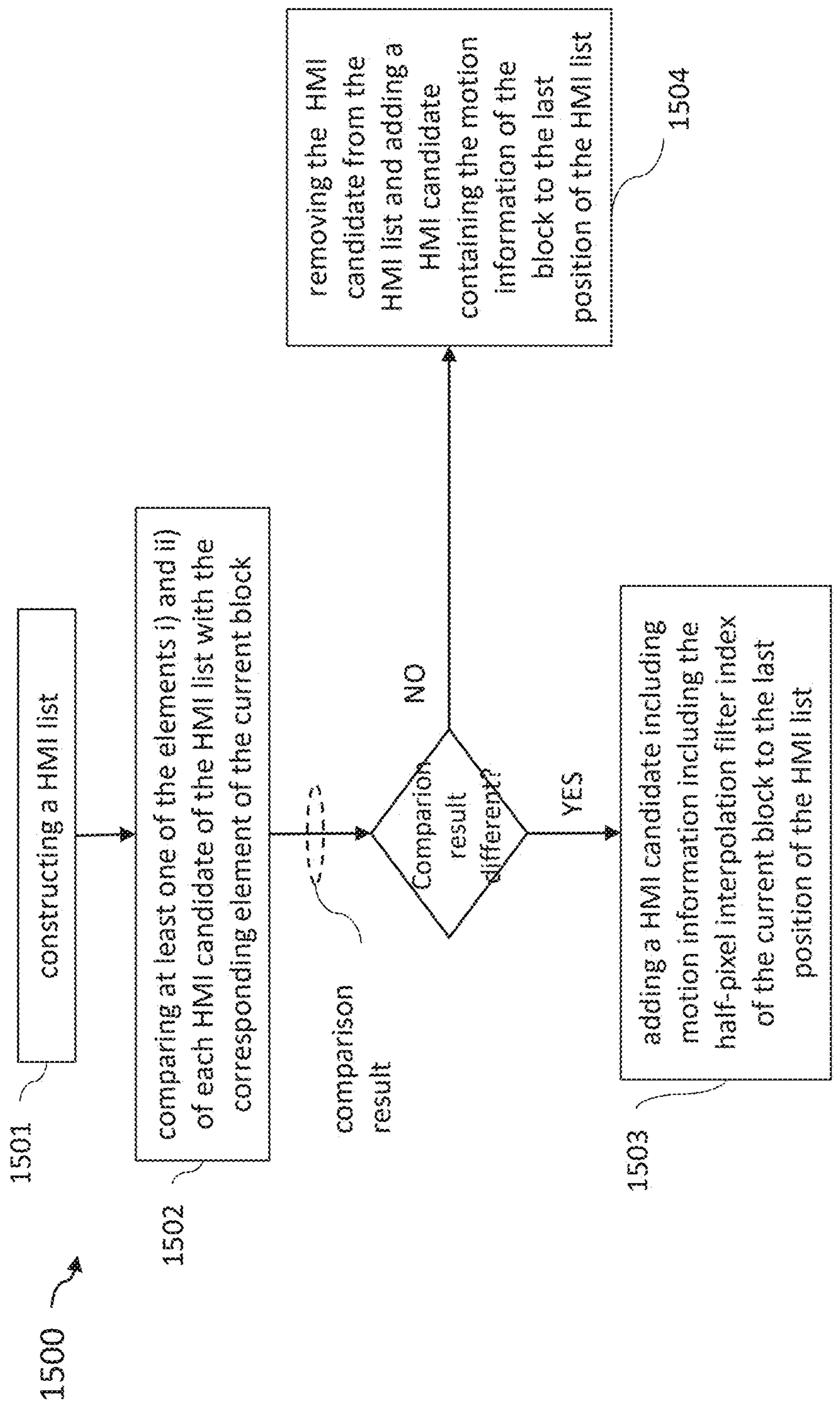
FIG. 15 is a flowchart showing an example of the HMI list updating method.

FIG. 15 shows a flowchart of the method for constructing and updating a history-based motion information candidate list (namely HMI list). In operation 1501, a HMI list is constructed. In operation 1502, at least one of the elements i) and ii) of each history-based motion information candidate of the HMVP list is compared with the corresponding element of the current block. The operation 1502 involving comparing whether the motion vectors of a history-based motion information candidate in the history-based motion information candidate list are same as the corresponding motion vectors of the block, and comparing whether the reference picture indices of the history-based motion information candidate are same as the corresponding reference picture indices of the block. In an embodiment, the operation 1502 involving comparing whether at least one of the motion vectors of each history-based motion information candidate are different from the corresponding motion vector of the block, and comparing whether at least one of the reference picture indices of each HMVP candidate is different from the corresponding reference picture index of the block. The result of the element-based comparison is referred to as comparison-result in FIG. 15.

If the comparison-result is that at least one of the following elements i) and ii) of each history-based motion information candidate of the history-based motion information candidate list differs from a corresponding element of the motion information of the block, the motion information of the current block is added to the last position of the HMVP list (operation 1503). Otherwise, if the following elements i) and ii) of a history-based motion information candidate of the history-based motion information candidate list are the same as corresponding elements of the motion information of the block, the history-based motion information candidate is removed from the history-based motion information candidate list and a history-based motion information candidate Hk, k=N−1 containing the motion information of the block is added to the last position of the history-based motion information candidate list (operation 1504).

The above comparison would then be performed only on checking differences with respect to the MVs and the reference picture indices, without comparison of IF index.

Additional embodiments are summarized in the following aspects:

According to a first aspect, a method of deriving an interpolation filter index (or an interpolation filter set index) for a current block, comprising:

constructing history-based motion information list (HMIL or HMVP table) which is an ordered list of N motion records Hk, k=0, . . . , N−1, associated with N preceding blocks of a frame, wherein N is greater or equal 1, wherein each motion record comprises one or more motion vectors, one or more reference picture indices corresponding to the one or more motion vectors and an interpolation filter index (or an interpolation filter set index) corresponding to the one or more motion vectors (such as the same filter index or the same filter set index for both two MVs); and determining a history-based motion information candidate (such as a HMVP candidate) for a current block based on the history-based motion information list (such as, determining a HMVP candidate for a current block from the HMVP list or HMVP table).

In an embodiment, wherein the determining a history-based motion information candidate for a current block based on the history-based motion information list comprising:

deriving or inferring or determining, an interpolation filter index (or an interpolation filter set index) of a record Hk as an interpolation filter index (or an interpolation filter set index) for the current block, wherein the determined or selected history-based motion information candidate (such as HMVP candidate) corresponds to the record Hk.

In an embodiment, wherein the motion records in the history-based motion information list are ordered in an order in which the motion records of said preceding blocks are obtained from a bit stream.

In an embodiment, the history-based motion information list has a length of N, and the N is 5.

In an embodiment, constructing history-based motion information list (HMVL) comprising:

checking, prior to adding motion information of the current block to HMVL, whether each element of HMVL differs from the motion information of current block; and adding motion information of current block to HMVL only if each element of HMVL differs from the motion information of current block.

In an embodiment, checking whether each element of HMVL differs from the motion information of current block comprising:

comparing of corresponding motion vectors, and comparing of corresponding reference picture indices.

In an embodiment, checking whether each element of HMVL differs from the motion information of current block comprising:

comparing of interpolation filter indices.

In an embodiment, the method further comprising: deriving motion information from the motion information of a first block, wherein the first block has preset spatial or temporal position relationship with the current block.

In an embodiment, the method further comprising:

deriving motion information from the motion information of a second block, wherein the second block is reconstructed before the current block.

In an embodiment, the history-based motion information list (HMIL or HMVP table) is a subset of a candidate motion information list of the current block when the current block is in a merge mode, or a subset of a candidate prediction motion information list of the current block when the current block is in a AMVP mode.

In an embodiment, only one interpolation filter set index corresponds to the one or more motion vectors in the HMVP candidate (such as the same filter set index for both two MV); or one or more interpolation filter set indexes correspond to the one or more motion vectors in the HMVP candidate respectively.

According to a second aspect, a method of inter prediction for a current block, comprising:

inter predicting the current block, comprising deriving an interpolation filter index (or an interpolation filter set index) for the current block;

wherein the deriving an interpolation filter index (or an interpolation filter set index) for a current block, comprises:

determining a HMVP candidate for the current block from a HMVP list (such as HMVP table), wherein the HMVP candidate comprises at least one motion vector, at least one reference picture index corresponding to the at least one motion vector and at least one interpolation filter index (or interpolation filter set index) corresponding to at least one motion vector (such as, only one interpolation filter index or only one interpolation filter set index for a whole candidate);

deriving or inferring or determining, an interpolation filter index (or an interpolation filter set index) of the determined or selected HMVP candidate as an interpolation filter index (or an interpolation filter set index) for the current block;

wherein one or more candidates (such as each candidate) of the HMVP list comprises at least one motion vector and an interpolation filter index (or at least one interpolation filter set index) corresponding to the at least one motion vector.

In an embodiment, an interpolation filter index (or an interpolation filter set index) corresponds to the one or more motion vectors in the HMVP candidate; or one or more interpolation filter index (or one or more interpolation filter set indices) correspond to the one or more motion vectors in the HMVP candidate.

According to a third aspect, a method of deriving an interpolation filter for a coding unit coded in merge mode based on a position of a current coding unit within a CTU, comprising:

parsing or deriving a first merge index from a bitstream, selecting a merge candidate from a merge candidate list according to the first merge index, determining whether the current coding unit overlaps with a top or left border of the CTU;

setting an interpolation filter index (or interpolation filter set index) for the current coding unit to a predefined value if the current coding unit overlaps with a top or left border of the CTU, otherwise, setting an interpolation filter index (or interpolation filter set index) for the current coding unit equal to the interpolation filter index (or interpolation filter set index) of the selected merge candidate, selecting, based on the interpolation filter index (or interpolation filter set index), a first interpolation filter set from N interpolation filter sets (such as N predefined interpolation filter sets), where N in integer number greater or equal than 2, for each motion vector of the selected merge candidate, selecting an interpolation filter from the first interpolation filter set based on a fractional position (such as a luma location in fractional-sample units (xFracL, yFracL)) of the motion vector.

In an embodiment, further comprising:

constructing the merge candidate list, wherein each candidate comprise one or more motion vectors and an interpolation filter index (or an interpolation filter set index specifying one of N interpolation filter sets (such as N predefined interpolation filter sets)).

In a possible implementation form of the method according to any preceding implementation of the third aspect or the third aspect as such, wherein the determining whether the current coding unit overlaps with a top or left border of the CTB or CTU, comprises: determining whether the top left corner (such as a luma location (xCb, yCb) specifying the top-left sample of the current coding block relative to the top left luma sample of the current picture) of the current block overlaps with the top border of the CTU containing the current coding unit.

In an embodiment, the determining whether the top left corner of the current block overlaps with the top border of the CTU containing the current coding unit comprises:

obtaining a vertical position (y coordinate) of the top left corner of the current block;

calculating a remainder after a division of the obtained vertical position (y coordinate) by the height of CTU;

inferring top left corner of the current block overlapping with the top border of the current CTU if calculated remainder equals to zero, otherwise inferring top left corner of the current coding unit not overlapping with the top border of the current CTU.

In an embodiment, the determining whether the top left corner of the current coding unit overlaps with the top border of the CTU containing the current coding unit comprises:

calculating a first value as the floor value of a current block top left vertical coordinate (coordinate y) divided by a CTU height;

calculating a second value as the floor value of the top-left of an inherited neighbor block vertical coordinator divided by CTU height; and inferring the top left corner of the current coding unit overlapping with the top border of current CTU if the second value equals to the first value.

In a possible implementation form of the method according to any preceding implementation of the third aspect or the third aspect as such, the determining whether the top left corner of the current coding unit overlaps with the top border of the CTU containing the current coding unit comprises:

calculating a third value as (yCb>>Ctb Log 2SizeY) <<Ctb Log 2SizeY, where yCb is top left vertical coordinate (coordinate y) of current block, ">>" is right logical or arithmetic bit shift, "<<" is left logical or arithmetic bit shift, and Ctb Log 2SizeY is a binary logarithm scale of CTU size;

inferring top left corner of the current coding unit overlapping with the top border of the current CTU if (yCb-1) is less than the third value.

In an embodiment, the second predefined area contains or covers the top left corner of CTU containing the current block.

In an embodiment, the determining whether the top left corner of the current block overlaps with the left border of the CTU containing the current block comprises:

obtaining a horizontal position (x coordinate) of top left corner of the current coding unit;

calculating a remainder after a division of the obtained horizontal position (x coordinate) by the width of the CTU;

inferring top left corner of the current coding unit overlapping with the left border of the current CTU if the calculated remainder equals to zero, otherwise inferring top left corner of the current coding unit not overlapping with the left border of the current CTU.

In an embodiment, the determining whether the top left corner of the current coding unit overlaps with the left border of the CTU containing the current coding unit comprises:

calculating a fourth value as a floor value, wherein a current block top left horizontal coordinate (coordinate x) is divided by CTU width, to obtain the floor value;

calculating a fifth value as a floor value, wherein the top-left of the inherited neighbor block vertical coordinator is divided by the CTU width, to obtain the floor value;

inferring top left corner of the current coding unit overlapping with the left border of the current CTU if the fifth value is equal to the fourth value.

In a possible implementation form of the method according to any preceding implementation of the third aspect or the third aspect as such, the determining whether the top left corner of the current coding unit overlaps with the left border of the CTU containing the current coding unit comprises:

calculating a sixth value as (xCb>>Ctb Log 2SizeX) <<Ctb Log 2SizeX, where xCb is a top left vertical coordinate (coordinate y) of current block, ">>" is right logical or arithmetic bit shift, "<<" is left logical or arithmetic bit shift, Ctb Log 2SizeX is binary logarithm scale of a CTU width;

inferring top left corner of the current coding unit overlapping with the left border of the current CTU if (xCb-1) is less than the sixth value.

In an embodiment, instead of combination of left and right shift on N bits operations conjunction with bitmask containing bit 0 in N least significant positions and containing bit 1 in the other positions (For example (yCb>>Ctb Log 2SizeY) <<Ctb Log 2SizeY can be calculated as conjunction of yCb with bitmask containing bit 0 in Ctb Log 2SizeY least significant positions and containing bit 1 in the other positions).

In an embodiment, the selected interpolation filter is applied to reference samples to generate a predicted sample that falls into a fractional position between reference samples; or the selected interpolation filter is used to generate prediction samples within the current coding unit (such as generate prediction samples of a sub-block of the current coding unit). According to a fourth aspect, a method of inter prediction for a current block, comprising:

when condition meets, at least two luma locations have the same half sample interpolation filter indices, and the same bi-prediction weight indices.

In an embodiment, —When availableA1 is equal to TRUE, the luma locations (xNbA1, yNbA1) and (xNbB1, yNbB1), or the luma locations (xNbA1, yNbA1) and (xNbB0, yNbB0), or the luma locations (xNbA1, yNbA1) and (xNbA0, yNbA0), or the luma locations (xNbA1, yNbA1) and (xNbA0, yNbA0), or the luma locations (xNbA1, yNbA1) and (xNbB2, yNbB2) have the same bi-prediction weight indices and the same half sample interpolation filter indices.

In an embodiment, when availableB1 is equal to TRUE, the luma locations (xNbB1, yNbB1) and (xNbB0, yNbB0), or the luma locations (xNbB1, yNbB1) and (xNbA0, yNbA0), or the luma locations (xNbB1, yNbB1) and (xNbB2, yNbB2), have the same bi-prediction weight indices and the same half sample interpolation filter indices In an embodiment, when availableB0 is equal to TRUE, the luma locations (xNbB0, yNbB0) and (xNbA0, yNbA0), or the luma locations (xNbB0, yNbB0) and (xNbB2, yNbB2) have the same bi-prediction weight indices and the same half sample interpolation filter indices.

In an embodiment, when availableA0 is equal to TRUE, the luma locations (xNbA0, yNbA0) and (xNbB2, yNbB2) have the same bi-prediction weight indices and the same half sample interpolation filter indices.

According to a fifth aspect, a method of inter prediction for a current block, comprising:

when conditions meet, a MVP candidate and a merging candidate have the same motion vectors and the same reference indices.

In an embodiment, obtaining half sample interpolation filter index;

when conditions meet, a MVP candidate and a merging candidate have the same half sample interpolation filter indices, and the same motion vectors and the same reference indices.

In a possible implementation form of the method according to any preceding implementation of the fifth aspect or the fifth aspect as such, obtaining half sample interpolation filter index;

when conditions including the half sample interpolation filter index meet, a MVP candidate and a merging candidate have the same motion vectors and the same reference indices.

The details of embodiments of deriving motion information including an interpolation filter set index for the block based on the merge candidate list of the proposed method (see, the operation 1403 of the method 1400 as illustrated in FIG. 14) are described as follows in the format of a modification to the specification of the VVC working draft. The modification is highlighted.

8.5.2 Derivation Process for Motion Vector Components and Reference Indices 8.5.2.1 General Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are:

the luma motion vectors in 1/16 fractional-sample accuracy mvL0[0][0] and mvL1[0][0], the reference indices refIdxL0 and refIdxL1, the prediction list utilization flags predFlagL0[0][0] and predFlagL1 [0][0], the half sample interpolation filter index hpelIfIdx, the bi-prediction weight index bcwIdx.

Let the variable LX be RefPicList[X], with X being 0 or 1, of the current picture.

For the derivation of the variables mvL0[0][0] and mvL1[0][0], refIdxL0 and refIdxL1, as well as predFlagL0[0][0] and predFlagL1[0][0], the following applies:

If general_merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the half sample interpolation filter index hpelIfIdx, the bi-prediction weight index bcwIdx and the merging candidate list mergeCandList.

Otherwise, the following applies:

For X being replaced by either 0 or 1 in the variables predFlagLX[0][0], mvLX[0][0] and refIdxLX, in PRED_LX, and in the syntax elements ref_idx_IX and MvdLX, the following ordered operations apply:

1. The variables refIdxLX and predFlagLX[0][0] are derived as follows:

If inter_pred_idc[xCb][yCb] is equal to PRED_LX or PRED_BI, $$refIdxLX = \text{ref\_idx\_IX}[xCb][yCb] \quad (8\text{-}292)$$

$$predFlagLX[0][0] = 1 \quad (8\text{-}293)$$

Otherwise, the variables refIdxLX and predFlagLX[0][0] are specified by:

$$refIdxLX = -1 \quad (8\text{-}294)$$

$$predFlagLX[0][0] = 0 \quad (8\text{-}295)$$

2. The variable mvdLX is derived as follows:

$$mvdLX[0] = MvdLX[xCb][yCb][0] \quad (8\text{-}296)$$

$$mvdLX[1] = MvdLX[xCb][yCb][1] \quad (8\text{-}297)$$

3. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.

4. When predFlagLX[0][0] is equal to 1, the luma motion vector mvLX[0][0] is derived as follows:

$$uLX[0] = (mvpLX[0] + mvdLX[0] + 2^{18})\ \%\ 2^{18} \quad (8\text{-}298)$$

$$mvLX[0][0][0] = (uLX[0] >= 2^{17})\ ?\ (uLX[0] - 2^{18}) : uLX[0] \quad (8\text{-}299)$$

$$uLX[1] = (mvpLX[1] + mvdLX[1] + 2^{18})\ \%\ 2^{18} \quad (8\text{-}300)$$

$$mvLX[0][0][1] = (uLX[1] >= 2^{17})\ ?\ (uLX[1] - 2^{18}) : uLX[1] \quad (8\text{-}301)$$

NOTE 1—The resulting values of mvLX [0][0][0] and mvLX [0][0][1] as specified above will always be in the range of $-2^{17}$ to $21^{7}-1$, inclusive.

The half sample interpolation filter index hpelIfIdx is derived as follows:

$$hpelIfIdx = A\ mvrShift == 3\ ?\ 1:0 \quad (8\text{-}302)$$

The bi-prediction weight index bcwIdx is set equal to bcw_idx[xCb][yCb].

When all of the following conditions are true, refIdxL1 is set equal to −1, predFlagL1 is set equal to 0, and bcwIdx is set equal to 0:

predFlagL0[0][0] is equal to 1.

predFlagL1[0][0] is equal to 1.

The value of (cbWidth+cbHeight) is equal to 12.

The updating process for the history-based motion vector predictor list as specified in clause 8.5.2.16 is invoked with luma motion vectors mvL0 [0][0] and mvL1[0][0], reference indices refIdxL0 and refIdxL1, prediction list utilization flags predFlagL0[0][0] and predFlagL1 [0][0], bi-prediction weight index bcwIdx, and half sample interpolation filter index hpelIfIdx.

It can be understood that the method is applied for both Uni and Bi prediction. It can be understood that two reference indices and two prediction list utilization flags are transferred in the specification of the VVC working draft, but in case of uni prediction predFlagL1 is set equal to 0 which means that L1 prediction is not used, refIdxL1 is set equal to −1 in this case.

The details of embodiments of derivation of history-based merging candidates of the proposed method (see, the operation 1402 of the method 1400 as illustrated in FIG. 14) are described as follows in the format of the modification of the specification of the VVC draft. The modification is highlighted.

8.5.2.6 Derivation Process for History-Based Merging Candidates

Inputs to this process are:

a merge candidate list mergeCandList, the number of available merging candidates in the list numCurrMergeCand.

Outputs to this process are:

the modified merging candidate list mergeCandList, the modified number of merging candidates in the list numCurrMergeCand.

The variables is Pruned $A_1$ and is Pruned B1 are both set equal to FALSE.

For each candidate in HmvpCandList[hMvpIdx] with index hMvpIdx=1 . . . NumHmvpCand, the following ordered operations are repeated until numCurrMergeCand is equal to MaxNumMergeCand−1:

1. The variable sameMotion is derived as follows:

If all of the following conditions are true for any merging candidate N with N being $A_1$ or $B_1$, sameMotion and is Pruned N are both set equal to TRUE:

hMvpIdx is less than or equal to 2.

The candidate HmvpCandList[NumHmvpCand−hMvpIdx] and the merging candidate N have the same motion vectors and the same reference indices.

is Pruned N is equal to FALSE.

Otherwise, sameMotion is set equal to FALSE.

2. When sameMotion is equal to FALSE, the candidate HmvpCandList[NumHmvpCand−hMvpIdx] is added to the merging candidate list as follows:

mergeCandList[numCurrMergeCand++]=HmvpC and List[NumHmvpCand−hMvpIdx] (8-381)

The details of a first possible implementation of updating the history-based motion information (HMVP) candidate list of the proposed method (see, the operation 1303, 1313 as illustrated in FIGS. 13A and 13B) are described as follows in the format of the modification of the specification of the VVC draft. The modification is highlighted.

8.5.2.16 Updating Process for the History-Based Motion Vector Predictor Candidate List Inputs to this process are:

luma motion vectors in 1/16 fractional-sample accuracy mvL0 and mvL1, reference indices refIdxL0 and refIdxL1, prediction list utilization flags predFlagL0 and predFlagL1, bi-prediction weight index gbiIdx.

the half sample interpolation filter set index hpellfIdx

The MVP candidate hMvpCand consists of the luma motion vectors mvL0 and mvL1, the reference indices refIdxL0 and refIdxL1, the prediction list utilization flags predFlagL0 and predFlagL1, bi-prediction weight index gbiIdx and the half sample interpolation filter set index hpellfIdx The candidate list H mvpCandList is modified using the candidate hMvpCand by the following ordered operations:

1. The variable identicalCandExist is set equal to FALSE and the variable removeIdx is set equal to 0.
2. When NumHmvpCand is greater than 0, for each index hMvpIdx with hMvpIdx=0 . . . NumHmvpCand−1, the following operations apply until identicalCandExist is equal to TRUE:
   When hMvpCand is equal to HmvpCandList [hMvpIdx], identicalCandExist is set equal to TRUE and removeIdx is set equal to hMvpIdx.
3. The candidate list HmvpCandList is updated as follows:
   If identicalCandExist is equal to TRUE or NumHmvpCand is equal to MaxNumMergeCand−1, the following applies:
      For each index i with i=(removeIdx+1) . . . (NumHmvpCand−1), HmvpCandList[i−1] is set equal to HmvpCandList[i].
      HmvpCandList [NumHmvpCand−1] is set equal to mvCand.
   Otherwise (identicalCandExist is equal to FALSE and NumHmvpCand is less than MaxNumMergeCand−1), the following applies:
      HmvpCandList[NumHmvpCand++] is set equal to mvCand.

The details of an embodiment of updating the history-based motion information (HMVP) candidate list of the proposed method (see, the operations 1303, 1313 as illustrated in FIGS. 13A and 13B, see the operations 1502-1504 as illustrated in FIG. 15) are described as follows in the format of the modification of the specification of the VVC draft. The modification is highlighted.

8.5.2.16 Updating Process for the History-Based Motion Vector Predictor Candidate List Inputs to this process are:

luma motion vectors in 1/16 fractional-sample accuracy mvL0 and mvL1, reference indices refIdxL0 and refIdxL1, prediction list utilization flags predFlagL0 and predFlagL1, bi-prediction weight index bcwIdx, half sample interpolation filter index hpellfIdx.

The MVP candidate hMvpCand consists of the luma motion vectors mvL0 and mvL1, the reference indices refIdxL0 and refIdxL1, the prediction list utilization flags predFlagL0 and predFlagL1, the bi-prediction weight index bowIdx and the half sample interpolation filter index hpellfIdx.

The candidate list HmvpCandList is modified using the candidate hMvpCand by the following ordered operations:

4. The variable identicalCandExist is set equal to FALSE and the variable removeIdx is set equal to 0.
5. When NumHmvpCand is greater than 0, for each index hMvpIdx with hMvpIdx=0 . . . NumHmvpCand−1, the following operations apply until identicalCandExist is equal to TRUE:
   When hMvpCand and HmvpCandList[hMvpIdx] have the same motion vectors and the same reference indices, identicalCandExist is set equal to TRUE and removeIdx is set equal to hMvpIdx.
6. The candidate list HmvpCandList is updated as follows:
   If identicalCandExist is equal to TRUE or NumHmvpCand is equal to 5, the following applies:
      For each index i with i=(removeIdx+1) . . . (NumHmvpCand−1), HmvpCandList[i−1] is set equal to HmvpCandList[i].
      HmvpCandList[NumHmvpCand−1] is set equal to hMvpCand.
   Otherwise (identicalCandExist is equal to FALSE and NumHmvpCand is less than 5), the following applies:
      HmvpCandList[NumHmvpCand++] is set equal to hMvpCand.

As can be seen from above, the second implementation specifies the compared elements i) and ii) of HMVP candidates, while the first implementation specifies the compared all elements (such as elements i), ii) and iii) of HMVP candidates.

The embodiments have their respective methods, and have corresponding apparatuses.

Figure 16:
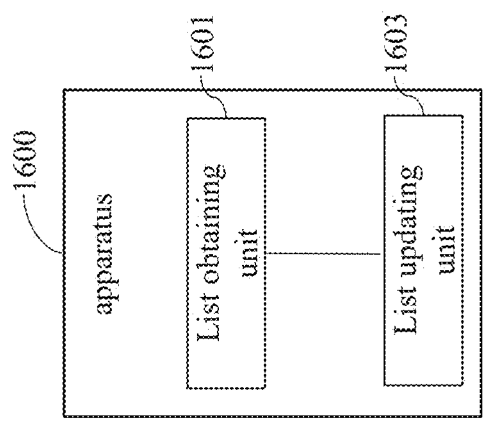
FIG. 16 is a block diagram of an apparatus according to an embodiment.

FIG. 16 shows a schematic of an apparatus 1600 for constructing a history-based motion information candidate list which comprises an HMI list obtaining unit 1601, and an HMI list updating unit 1603.

The history-based motion information (HMI) candidate list obtaining unit 1601 is configured to obtain a history-based motion information candidate list, wherein the HMI list is an ordered list of N history-based motion information candidates $H_k$, k=0, . . . , N−1, associated with motion information of a plurality of blocks preceding a block, wherein N is an integer number greater than 0, wherein each history-based motion information candidate includes elements:

iv) one or more motion vectors, MVs,
v) one or more reference picture indices corresponding to the MVs, and
vi) an interpolation filter index;

a history-based motion information candidate list updating unit 1603 is configured to update the HMI list based on motion information of the block, wherein the motion information of the block includes elements:

iv) one or more motion vectors, MVs,
v) one or more reference picture indices corresponding to the MVs, and
vi) an interpolation filter index.

It may be understood that the HMI list obtaining unit 1601 and an HMI list updating unit 1603 (corresponding to an inter prediction module) in the encoder 20 or the decoder 30 provided in this embodiment of this application is a functional entity for implementing various execution operations included in the foregoing corresponding method, that is, has a functional entity for completely implementing operations in the method in this application and extensions and variations of these operations. For details, refer to the foregoing descriptions of the corresponding method. For brevity, details are not described herein again.

Figure 17:
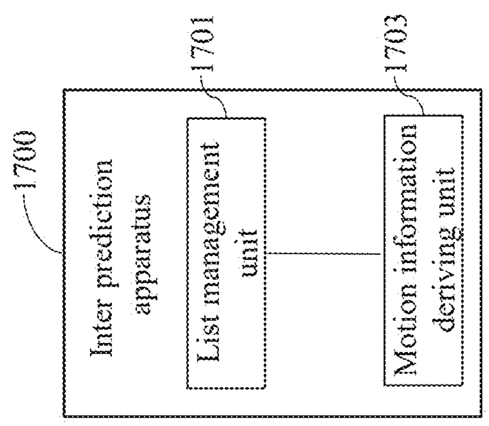
FIG. 17 is a block diagram of another apparatus according to an embodiment.

FIG. 17 shows a schematic of an inter prediction apparatus 1700 according to an embodiment. The apparatus 1700 is provided for determining motion information for a current block of a frame. The apparatus 1700 comprises:

a list management unit 1701 configured to construct the HMVP list, which is an ordered list of N history-based candidates Hk, k=0, . . . , N−1, associated with motion information of N preceding blocks of the frame preceding the current block, wherein N is greater than or equal to 1, wherein each or at least one history-based candidate comprises motion information including elements: i) one or more motion vectors, MVs, ii) one or more reference picture indices corresponding to the MVs, and iii) an interpolation filter index (such as a half-pel interpolation filter index) or an interpolation filter set index; the HMVP list management unit 1701 is further configured to add one or more history-based candidates from the HMVP list into a motion information candidate list for the current block; and an information deriving unit 1703 configured to derive the motion information based on the motion information candidate list.

In an embodiment, the list management unit 1701 is configured to compare at least one of the elements of each history-based candidate of the HMI list with the corresponding element of the current block. A motion information adding unit is configured to add the motion information of the current block to the HMI list, if, as a result of comparing, at least one of the elements of each of the history-based candidates of the HMI list differs from the corresponding element of the motion information of the current block.

Correspondingly, in one example, an example structure of the apparatus 1700 may be corresponding to encoder 20 in FIG. 2. In another example, an example structure of the apparatus 1700 may be corresponding to the decoder 30 in FIG. 3.

In another embodiment, an example structure of the apparatus 1700 may be corresponding to the inter prediction unit 244 in FIG. 2. In another example, an example structure of the apparatus 1700 may be corresponding to the inter prediction unit 344 in FIG. 3.

It may be understood that the list management unit 1701 and an information deriving unit 1703 (corresponding to an inter prediction module) in the encoder 20 or the decoder 30 provided in this embodiment of this application is a functional entity for implementing various execution operations included in the foregoing corresponding method, that is, has a functional entity for completely implementing operations in the method in this application and extensions and variations of these operations. For details, refer to the foregoing descriptions of the corresponding method. For brevity, details are not described herein again.

In an embodiment, the following aspects which are related to SIF index propagation across the CTU boundaries are described:

As described above, based on the current SIF design, when the SIF technique is applied in a mode inheriting motion information from the top spatial neighbor, the line memory will be increased if the current block is located at the top border of the CTU/CTB. In the description presented herein, the location of the current block is checked. If the current block is located at the top border of the CTU/CTB, when inheriting the motion information from the top left (B0), top (B1) top-right (B2) neighbor blocks, the IF index is not inheriting from neighboring block but instead uses the default value to reduce the line memory usage.

In an aspect, a method of inter prediction for a current block is provided, which comprises:

inter predicting the block, comprising deriving an interpolation filter index for the current block based on a position of the current block (such a coding unit or coding block) within a coding tree blocks (CTB) or coding tree units (CTU) and an interpolation filter index inherited from a selected merge candidate.

Figure 8:
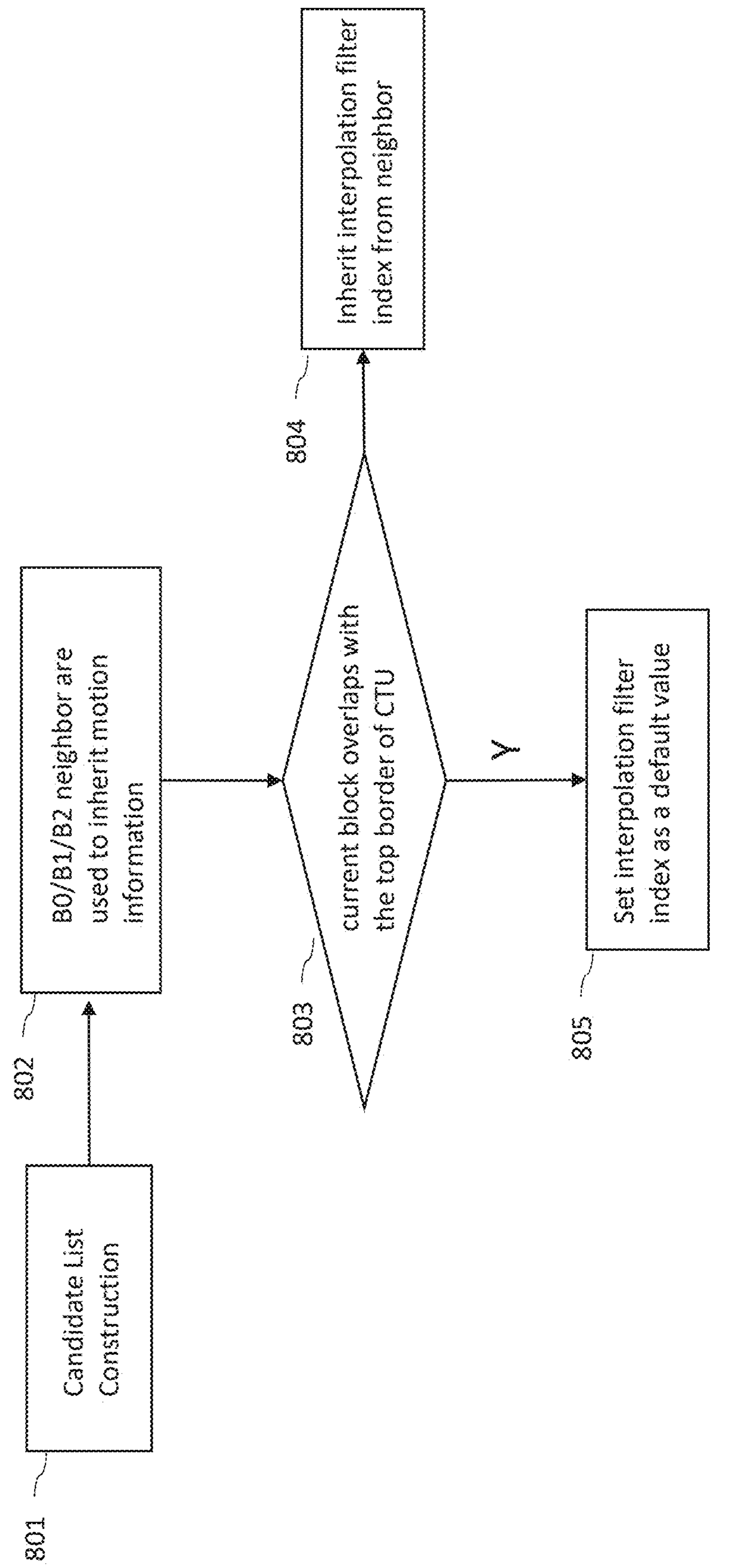
FIG. 8 shows a flowchart of a method according to an embodiment.

FIG. 8 shows a flowchart of a method for deriving an interpolation filter set index for a current block (such as a coding unit or a coding block) within a coding tree block (CTB) or a coding tree unit (CTU), comprising:

In operation 803, the method involves determining whether the current block overlaps with a predefined area of the CTB or CTU (such as the top or left border of the CTB or CTU);

In operation 804, the method involves setting the interpolation filter set index for the current block as an interpolation filter set index of a selected candidate if the current block does not overlap with the predefined area of the CTU (e.g., the current block does not overlap with the top or left border of the CTB or CTU). The selected candidate can be, for example, a selected merge candidate or a selected MVP candidate. The selected candidate can also be a neighboring block corresponding to a selected merge candidate.

In operation 805, the method involves setting the interpolation filter set index for the current block to a predefined value if the current block overlaps with the predefined area of the CTB or CTU (such as the top or left border of the CTB or CTU).

Further, in operations 801-802, the method involves candidate list construction. For brevity, details are not described herein again.

Figure 9:
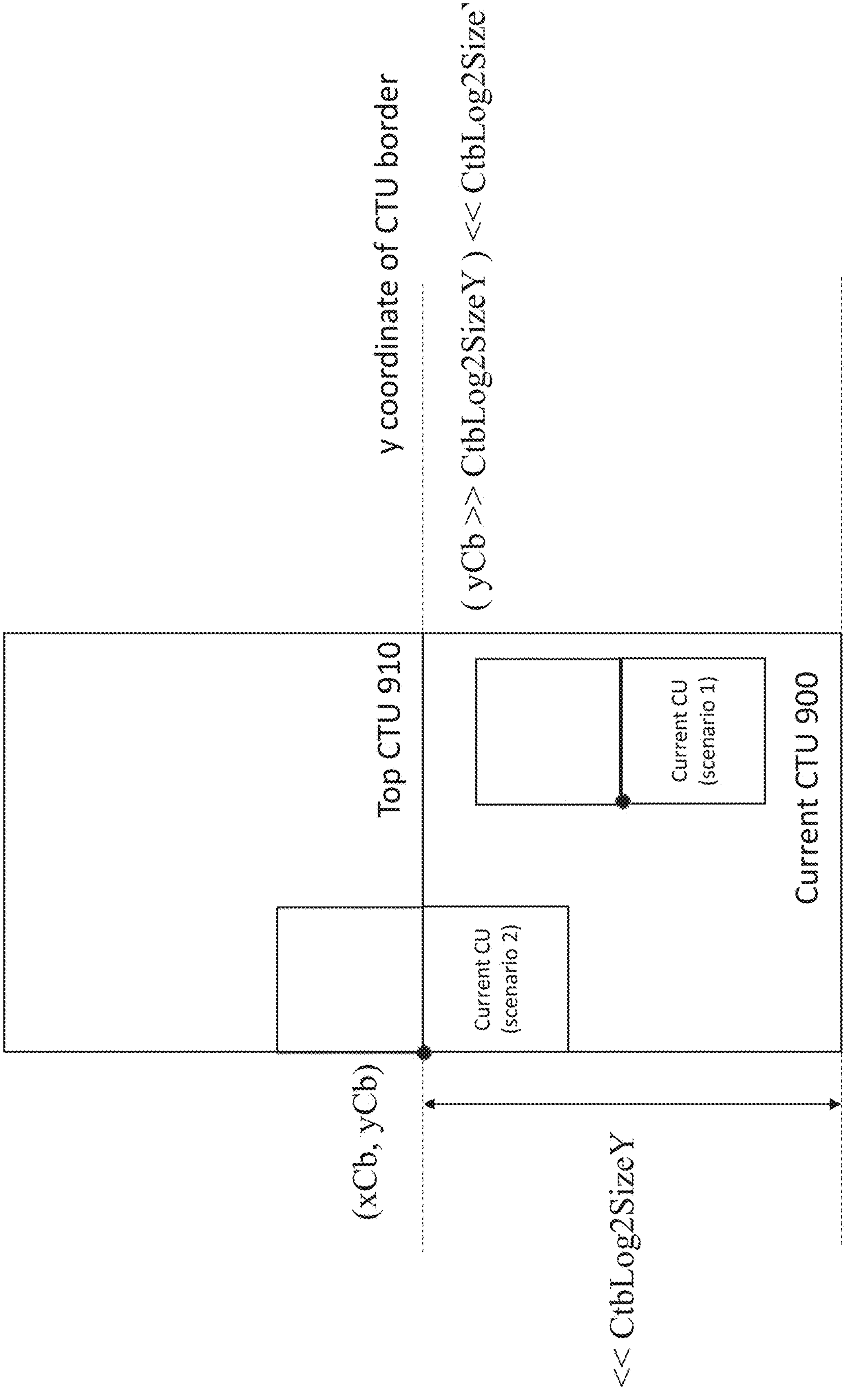
FIG. 9 shows a block diagram illustrating a method for deriving an interpolation filter index for a current block (such as a coding unit or a coding block) within a coding tree block (CTB) or a coding tree unit (CTU)

To decide whether the current block is located at the top border of the CTU 900, the vertical coordinate of its top left corner (yCb) is checked as depicted in FIG. 9. Supposing the size of the CTU 900 equals to (1<<Ctb Log 2SizeY)×(1<<Ctb Log 2SizeY), if (yCb>>Ctb Log 2SizeY)<<Ctb Log 2SizeY is not equal to yCb, then the current block is not located at the top border of the CTU 900 (scenario 1), otherwise (if (yCb>Ctb Log 2SizeY)<<Ctb Log 2SizeY is equal to yCb), then the current block is located at the top border of the CTU 900 (scenario 2).

According to an embodiment, the selected candidate (such as the selected merge candidate) is a spatial merge candidate.

According to an embodiment, a vertical position associated with the spatial merge candidate is less than a vertical position of the current block, or a vertical position of a neighboring block which corresponds to the spatial merge candidate is less than a vertical position of the current block.

According to an embodiment, the spatial merge candidate is an above right candidate (B0 shown in FIG. 6), an above candidate (B1 shown in FIG. 6), or an above left candidate (B2 shown in FIG. 6).

According to an embodiment, wherein the merge candidate is an affine merge candidate. The affine merge candidate is an inherited affine merge candidate, wherein "inherited" means (i) the candidate is derived based on a neighboring affine block, (ii) the affine model of the current block is inherited from the affine model of the neighboring affine block, or (iii) the affine parameter of the current block is derived based on the affine parameter of a neighboring affine block.

According to an embodiment, the inherited affine merge candidate is derived based on one of spatial neighboring blocks, wherein the spatial neighboring blocks comprise a bottom left block (such as A0 shown in FIG. 6), a left block (such as A1 shown in FIG. 6), an above right block (such as B0 shown in FIG. 6), an above block (such as B1 shown in FIG. 6), or an above left block (such as B2 shown in FIG. 6).

According to an embodiment, the inherited affine merge candidate is derived based on a block that has a vertical position less than a vertical position of the current block.

According to an embodiment, the inherited affine merge candidate is derived based on an above right block (such as B0 shown in FIG. 6), an above block (such as B1 shown in FIG. 6), or an above left block (such as B2 shown in FIG. 6).

According to an embodiment, the selected candidate (such as the selected merge candidate) is a subblock merge candidate.

According to an embodiment, wherein the predefined area of CTU coincides with the CTB or CTU.

According to an embodiment, the determining whether the current block overlaps with the predefined area is performed based on the position of top left corner (such as a luma location (xCb, yCb) specifying the top-left sample of the current block relative to the top left luma sample of the current picture) of the coding unit (such as the horizontal position and the vertical position of the top-left sample of the current block).

According to an embodiment, the current block is inferred to be overlapping with the predefined area (such as a top border of the CTU) if the top left corner of the current block overlaps with a second predefined area (such as the top left corner of the CTU).

According to an embodiment, the second predefined area contains or covers the top border of the CTU containing the current block (e.g., the top left corner of the CTU contains or covers the top border or left border of the CTU containing the current block).

According to an embodiment, the determining whether the current block overlaps with a predefined area of the CTB or CTU, comprises: determining whether the top left corner (such as a luma location (xCb, yCb) specifying the top-left sample of the current block relative to the top left luma sample of the current picture) of the current block overlaps with the top border of the CTU containing the current coding unit.

According to an embodiment, the determining whether the top left corner of the current block overlaps with the top border of the CTU containing the current coding unit comprises:

- obtaining a vertical position (y coordinate) of the top left corner of the current block;
- calculating a remainder after a division of the obtained vertical position (y coordinate) by the height of CTU;
- inferring the top left corner of the current block overlapping with the top border of the current CTU if the calculated remainder equals to zero, otherwise inferring the top left corner of the current coding unit not overlapping with the top border of the current CTU.

According to an embodiment of the present disclosure, the determining whether the top left corner of the current coding unit overlaps with the top border of the CTU containing the current coding unit comprises:

- calculating a first value as a floor value, wherein a current block top left vertical coordinate (coordinate y) is divided by a CTU height, to obtain the floor value;
- calculating a second value as a floor value, wherein the top-left of an inherited neighbor block vertical coordinator is divided by the CTU height, to obtain the floor value; and
- inferring the top left corner of the current coding unit overlapping with the top border of current CTU if the second value equals to the first value.

According to an embodiment, the determining whether the top left corner of the current coding unit overlaps with the top border of the CTU containing the current coding unit comprises:

- calculating a third value as (yCb>>Ctb Log 2SizeY) <<Ctb Log 2SizeY, where yCb is the top left vertical coordinate (coordinate y) of current block, ">>" is right logical or arithmetic bit shift, "<<" is left logical or arithmetic bit shift, and Ctb Log 2SizeY is a binary logarithm scale of the CTU or CTB size;
- inferring the top left corner of the current coding unit overlapping with the top border of the current CTU if (yCb−1) is less than the third value.

According to an embodiment, the second predefined area contains or covers the top left corner of CTU containing the current block.

According to an embodiment, the determining whether the top left corner of the current block overlaps with the left border of the CTU containing the current block comprises:

- obtaining a horizontal position (x coordinate) of top left corner of the current coding unit;
- calculating a remainder after a division of the obtained horizontal position (x coordinate) by the width of the CTU;
- inferring top left corner of the current coding unit overlapping with the left border of the current CTU if the calculated remainder equals to zero,
- otherwise inferring top left corner of the current coding unit not overlapping with the left border of the current CTU.

According to an embodiment, the determining whether the top left corner of the current coding unit overlaps with the left border of the CTU containing the current coding unit comprises:

- calculating a fourth value as a floor value, wherein a top left horizontal coordinate of the current block (coordinate x) is divided by the CTU width, to obtain the floor value;
- calculating a fifth value as a floor value, wherein the top-left of the inherited neighbor block vertical coordinator is divided by the CTU width, to obtain the floor value;
- inferring top left corner of the current coding unit overlapping with the left border of the current CTU if the fifth value is equal to the fourth value.

According to an embodiment, the determining whether the top left corner of the current coding unit overlaps with the left border of the CTU containing the current coding unit comprises:

- calculating a sixth value as (xCb>>Ctb Log 2SizeX) <<Ctb Log 2SizeX, where xCb is a top left vertical coordinate (coordinate y) of the current block, ">>" is right logical or arithmetic bit shift, "<<" is left logical or arithmetic bit shift, Ctb Log 2SizeX is binary logarithm scale of a CTU width;

inferring the top left corner of the current coding unit overlapping with the left border of the current CTU if (xCb−1) is less than the sixth value.

According to an embodiment, instead of combination of left and right shift on N bits operations conjunction with bitmask containing bit 0 in N least significant positions and containing bit 1 in the other positions (For example (yCb>>Ctb Log 2SizeY)<<Ctb Log 2SizeY can be calculated as conjunction of yCb with bitmask containing bit 0 in Ctb Log 2SizeY least significant positions and containing bit 1 in the other positions). For example, the value of yCb & 0xFFFFFF80 can be calculated instead of (yCb>>Ctb Log 2SizeY)<<Ctb Log 2SizeY, if yCb is within the range [0, 232−1] and Ctb Log 2SizeY is equal to 7.0xFFFFFF80 here is a bitmask containing zero in 7 least significant positions and one in the other positions.

According to an embodiment, to calculate the floor value of the division result, the logical or arithmetic shift is used. (For example floor value of a/2n can be calculated as a>>n).

According to an embodiment, the second predefined area contains or covers only the top border of the CTU containing the current block.

According to an embodiment, the second predefined area contains or covers only the left border of the CTU containing the current block.

According to an embodiment, the second predefined area contains or covers only top and left borders of the CTU containing the current block.

According to an embodiment, the setting the interpolation filter set index for the current block to a predefined value comprises:

setting the interpolation filter set index for the current block to a seventh value, wherein the seventh value is determined prior to merge list construction.

According to an embodiment, the determining the seventh value comprises:

determining an interpolation filter set index of one of spatial neighboring blocks of the current block and setting the seventh value equal to the determined interpolation filter set index. According to an embodiment of the present disclosure, "one of spatial neighboring blocks" means a left neighboring block (this block is referred as A1 in FIG. 6).

The details of embodiments of SIF index propagation across the CTU boundaries of the proposed method (the process is illustrated in FIGS. 8 and 9) are described as follows in the format of the modification of the specification of the working draft of SIF proposal). The modification is highlighted.

8.5.2.3 Derivation Process for Spatial Merging Candidates

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are as follows, with X being 0 or 1:

the availability flags $availableFlagA_0$, $availableFlagA_1$, $availableFlagB_0$, $availableFlagB_1$ and $availableFlagB_2$ of the neighbouring coding units, the reference indices $refIdxLXA_0$, $refIdxLXA_1$, $refIdxLXB_0$, $refIdxLXB_1$ and $refIdxLXB_2$ of the neighbouring coding units, the prediction list utilization flags $predFlagLXA_0$, $predFlagLXA_1$, $predFlagLXB_0$, $predFlagLXB_1$ and $predFlagLXB_2$ of the neighbouring coding units, the motion vectors in 1/16 fractional-sample accuracy $mvLXA_0$, $mvLXA_1$, $mvLXB_0$, $mvLXB_1$ and $mvLXB_2$ of the neighbouring coding units, the half sample interpolation filter indices $hpellfIdxA_0$, $hpellfIdxA_1$, $hpellfIdxB_0$, $hpellfIdxB_1$, and $hpellfIdxB_2$.

the bi-prediction weight indices $gbiIdxB_0$, $gbiIdxB_1$, $gbiIdxB_0$, $gbiIdxB_1$, and $gbiIdxB_2$.

For the derivation of $availableFlagA_1$, $refIdxLXA_1$, $predFlagLXA_1$ and $mvLXA_1$ the following applies:

The luma location ($xNbA_1$, $yNbA_1$) inside the neighbouring luma coding block is set equal to (xCb−1, yCb+cbHeight−1).

The availability derivation process for a block as specified in clause 6.4 is invoked with the current luma location (xCurr, yCurr) set equal to (xCb, yCb) and the neighbouring luma location ($xNbA_1$, $yNbA_1$) as inputs, and the output is assigned to the block availability flag $availableA_1$.

The variables $availableFlagA_1$, $refIdxLXA_1$, $predFlagLXA_1$ and $mvLXA_1$ are derived as follows:

If availableA1 is equal to FALSE, $availableFlagA_1$ is set equal to 0, both components of $mvLXA_1$ are set equal to 0, $refIdxLXA_1$ is set equal to −1 and $predFlagLXA_1$ is set equal to 0, with X being 0 or 1, and $gbiIdxB_1$ is set equal to 0.

Otherwise, $availableFlagA_1$ is set equal to 1 and the following assignments are made:

$$mvLXA_1 = MvLX[xNbA_1][yNbA_1] \quad (8\text{-}294)$$

$$refIdxLXA_1 = RefIdxLX[xNbA_1][yNbA_1] \quad (8\text{-}295)$$

$$predFlagLXA_1 = PredFlagLX[xNbA_1][yNbA_1] \quad (8\text{-}296)$$

$$hpellfIdxA_1 = HpelIfIdx[xNbA_1][yNbA_1] \quad (8\text{-}297)$$

$$gbiIdxA_1 = GbiIdx[xNbA_1][yNbA_1] \quad (8\text{-}297)$$

For the derivation of availableFlagB1, $refIdxLXB_1$, $predFlagLXB_1$ and $mvLXB_1$ the following applies:

The luma location ($xNbB_1$, $yNbB_1$) inside the neighbouring luma coding block is set equal to (xCb+cbWidth−1, yCb−1).

The availability derivation process for a block as specified in clause 6.4 is invoked with the current luma location (xCurr, yCurr) set equal to (xCb, yCb) and the neighbouring luma location ($xNbB_1$, $yNbB_1$) as inputs, and the output is assigned to the block availability flag $availableB_1$.

The variables $availableFlagB_1$, $refIdxLXB_1$, $predFlagLXB_1$ and $mvLXB_1$ are derived as follows:

If one or more of the following conditions are true, $availableFlagB_1$ is set equal to 0, both components of $mvLXB_1$ are set equal to 0, $refIdxLXB_1$ is set equal to −1 and $predFlagLXB_1$ is set equal to 0, with X being 0 or 1, and $gbiIdxB_1$ is set equal to 0:

$availableB_1$ is equal to FALSE.

$availableA_1$ is equal to TRUE and the luma locations $(xNbA_1, yNbA_1)$ and $(xNbB_1, yNbB_1)$ have the same motion vectors and the same reference indices.

Otherwise, $availableFlagB_1$ is set equal to 1 and the following assignments are made:

$$mvLXB_1 = MvLX[xNbB_1][yNbB_1] \quad (8\text{-}298)$$

$$refIdxLXB_1 = RefIdxLX[xNbB_1][yNbB_1] \quad (8\text{-}299)$$

$$predFlagLXB_1 = PredFlagLX[xNbB_1][yNbB_1] \quad (8\text{-}300)$$

If (yCb−1)<((yCb>>Ctblog2SizeY)<<Ctb Log 2SizeY) $hpelIfIdxB_1=2$

Otherwise, $$hpelIfIdxB_1 = HpelIfIdx[xNbB_1][yNbB_1] \quad (8\text{-}301)$$

$$gbiIdxB_1 = GbiIdx[xNbB_1][yNbB_1]$$

For the derivation of $availableFlagB_0$, $refIdxLXB_0$, $predFlagLXB_0$ and $mvLXB_0$ the following applies:

The luma location $(xNbB_0, yNbB_0)$ inside the neighbouring luma coding block is set equal to (xCb+cbWidth, yCb−1).

The availability derivation process for a block as specified in clause 6.4 is invoked with the current luma location (xCurr, yCurr) set equal to (xCb, yCb) and the neighbouring luma location $(xNbB_0, yNbB_0)$ as inputs, and the output is assigned to the block availability flag $availableB_0$.

The variables $availableFlagB_0$, $refIdxLXB_0$, $predFlagLXB_0$ and $mvLXB_0$ are derived as follows:

If one or more of the following conditions are true, $availableFlagB_0$ is set equal to 0, both components of $mvLXB_0$ are set equal to 0, $refIdxLXB_0$ is set equal to −1 and $predFlagLXB_0$ is set equal to 0, with X being 0 or 1, and $gbiIdxB_0$ is set equal to 0:

$availableB_0$ is equal to FALSE.

$availableB_1$ is equal to TRUE and the luma locations $(xNbB_1, yNbB_1)$ and $(xNbB_0, yNbB_0)$ have the same motion vectors and the same reference indices.

$availableA_1$ is equal to TRUE, the luma locations $(xNbA_1, yNbA_1)$ and $(xNbB_0, yNbB_0)$ have the same motion vectors and the same reference indices and merge_triangle_flag[xCb][yCb] is equal to 1.

Otherwise, $availableFlagB_0$ is set equal to 1 and the following assignments are made:

$$mvLXB_0 = MvLX[xNbB_0][yNbB_0] \quad (8\text{-}302)$$

$$refIdxLXB_0 = RefIdxLX[xNbB_0][yNbB_0] \quad (8\text{-}303)$$

$$predFlagLXB_0 = PredFlagLX[xNbB_0][yNbB_0] \quad (8\text{-}304)$$

If (yCb−1)<((yCb>>Ctb Log 2SizeY)<<Ctb Log 2SizeY) $hpelIfIdxB_0=2$

Otherwise, $$hpelIfIdxB_0 = HpelIfIdx[xNbB_0][yNbB_0] \quad (8\text{-}305)$$

$$gbiIdxB_0 = GbiIdx[xNbB_0][yNbB_0] \quad (8\text{-}305)$$

For the derivation of $availableFlagA_0$, $refIdxLXA_0$, $predFlagLXA_0$ and $mvLXA_0$ the following applies:

The luma location $(xNbA_0, yNbA_0)$ inside the neighbouring luma coding block is set equal to (xCb−1, yCb+cbWidth).

The availability derivation process for a block as specified in clause 6.4 is invoked with the current luma location (xCurr, yCurr) set equal to (xCb, yCb) and the neighbouring luma location $(xNbA_0, yNbA_0)$ as inputs, and the output is assigned to the block availability flag $availableA_0$.

The variables $availableFlagA_0$, $refIdxLXA_0$, $predFlagLXA_0$ and $mvLXA_0$ are derived as follows:

If one or more of the following conditions are true, $availableFlagA_0$ is set equal to 0, both components of $mvLXA_0$ are set equal to 0, $refIdxLXA_0$ is set equal to −1 and $predFlagLXA_0$ is set equal to 0, with X being 0 or 1, and $gbiIdxA_0$ is set equal to 0:

$availableA_0$ is equal to FALSE.

$availableA_1$ is equal to TRUE and the luma locations $(xNbA_1, yNbA_1)$ and $(xNbA_0, yNbA_0)$ have the same motion vectors and the same reference indices.

$availableB_1$ is equal to TRUE, the luma locations $(xNbB_1, yNbB_1)$ and $(xNbA_0, yNbA_0)$ have the same motion vectors and the same reference indices and merge_triangle_flag[xCb] [yCb] is equal to 1.

$availableB_0$ is equal to TRUE, the luma locations $(xNbB_0, yNbB_0)$ and $(xNbA_0, yNbA_0)$ have the same motion vectors and the same reference indices and merge_triangle_flag[xCb][yCb] is equal to 1.

Otherwise, $availableFlagA_0$ is set equal to 1 and the following assignments are made:

$$mvLXA_0 = MvLX[xNbA_0][yNbA_0] \quad (8\text{-}306)$$

$$refIdxLXA_0 = RefIdxLX[xNbA_0][yNbA_0] \quad (8\text{-}307)$$

$$predFlagLXA_0 = PredFlagLX[xNbA_0][yNbA_0] \quad (8\text{-}308)$$

$$hpelIfIdxA_0 = HpelIfIdx[xNbA_0][yNbA_0] \quad (8\text{-}309)$$

$$gbiIdxA_0 = GbiIdx[xNbA_0][yNbA_0] \quad (8\text{-}309)$$

For the derivation of $availableFlagB_2$, $refIdxLXB_2$, $predFlagLXB_2$ and $mvLXB_2$ the following applies:

The luma location $(xNbB_2, yNbB_2)$ inside the neighbouring luma coding block is set equal to (xCb−1, yCb−1).

The availability derivation process for a block as specified in clause 6.4 is invoked with the current luma location (xCurr, yCurr) set equal to (xCb, yCb) and the neighbouring luma location $(xNbB_2, yNbB_2)$ as inputs, and the output is assigned to the block availability flag $availableB_2$.

The variables $availableFlagB_2$, $refIdxLXB_2$, $predFlagLXB_2$ and $mvLXB_2$ are derived as follows:

If one or more of the following conditions are true, $availableFlagB_2$ is set equal to 0, both components of $mvLXB_2$ are set equal to 0, refIdxLXB2 is set equal to −1 and $predFlagLXB_2$ is set equal to 0, with X being 0 or 1, and $gbiIdxB_2$ is set equal to 0:

$availableB_2$ is equal to FALSE.

$availableA_1$ is equal to TRUE and the luma locations ($xNbA_1$, $yNbA_1$) and ($xNbB_2$, $yNbB_2$) have the same motion vectors and the same reference indices.

$availableB_1$ is equal to TRUE and the luma locations ($xNbB_1$, $yNbB_1$) and ($xNbB_2$, $yNbB_2$) have the same motion vectors and the same reference indices.

$availableB_0$ is equal to TRUE, the luma locations ($xNbB_0$, $yNbB_0$) and ($xNbB_2$, $yNbB_2$) have the same motion vectors and the same reference indices and merge_triangle_flag[xCb][yCb] is equal to 1.

$availableA_0$ is equal to TRUE, the luma locations ($xNbA_0$, $yNbA_0$) and ($xNbB_2$, $yNbB_2$) have the same motion vectors and the same reference indices and merge_triangle_flag[xCb][yCb] is equal to 1.

$availableFlagA_0$+$availableFlagA_1$+$availableFlagB_0$+$availableFlagB_1$ is equal to 4 and merge_triangle_flag[xCb][yCb] is equal to 0.

Otherwise, $availableFlagB_2$ is set equal to 1 and the following assignments are made:

$$mvLXB_2 = MvLX[xNbB_2][yNbB_2] \quad (8\text{-}310)$$

$$refIdxLXB_2 = RefIdxLX[xNbB_2][yNbB_2] \quad (8\text{-}311)$$

$$predFlagLXB_2 = PredFlagLX[xNbB_2][yNbB_2] \quad (8\text{-}312)$$

If (yCb−1)<((yCb>>Ctb Log 2SizeY)<<Ctb Log 2SizeY)
$hpelIfIdxB_2=2$
Otherwise, $$hpelIfIdxB_2 = HpelIfIdx[xNbB_2][yNbB_2] \quad (8\text{-}303)$$

$$gbiIdxB_2 = GbiIdx[xNbB_2][yNbB_2] \quad (8\text{-}313)$$

As can be seen from the above, the half-pixel interpolation filter index of a neighbour block of the current block is determined based on whether the current block overlaps with the CTU boundaries. For example, Eqns. (8-298)-(8-301) show the operations for determining the half-pixel interpolation filter index of the neighbour block B1 (see FIGS. 8 and 9). Eqns. (8-302)-(8-305) show the operations for determining the half-pixel interpolation filter index of the neighbour block B0 (see FIGS. 8 and 9). Eqns. (8-310)-(8-313) show the operations for determining the half-pixel interpolation filter index of the neighbour block B2 (see in FIGS. 8 and 9).

Based on the above, the present disclosure is directed to storing SIF index in an HMVP table (or propagating the SIF index via an HMVP table) and using it for HMVP candidates in a merge list construction process. SIF method is used to select appropriate interpolation filter (IF) depending on the content: for regions with the sharp edges a regular DCT-based IF is used; for smooth regions (or if preserving the sharp edges is not needed) an alternative 6-tap IF (a Gauss filter) is used. For a regular inter prediction, the IF index is explicitly signaled; while for the merge mode, not only MVs and reference picture indices are borrowed from the corresponding merge spatial candidate (HMVP merge candidate) but also the IF index is borrowed from the corresponding merge spatial candidate. This is in contrast with the conventional design where the IF index was not propagated via the HMVP table. So in the conventional design, for blocks coded in the merge mode and the merge candidate obtained from the HMVP table, the alternative IF could not be used. The HMVP table is used to store motion information from neighboring blocks (but not necessarily from the adjacent blocks like regular spatial merge candidates). The idea of HMVP is to use motion information from the blocks that are spatially close to the current one, but not necessarily adjacent (blocks from some spatial neighborhood). So, if, for example, the current block contains smooth content and adjacent blocks contain mostly sharp content, borrowing the IF index from the adjacent blocks would not be efficient. However, smooth content can be inside a block in some spatial neighborhood of the current block and the motion information of such block can be stored in HMVP table. Propagating the IF index through the HMVP table as presented herein allows the use of the appropriate IF for the current block (—e.g., a Gauss filter can be selected for smooth content or for cases where preserving sharp edges is not needed). This provides an advantage of improving the coding efficiency. Without the embodiments described herein, the default IF index (corresponding to an 8-tap DCT-base IF) is always used for HMVP merge candidate(s) and specifics of the content of the current block (whether sharp edges need to be preserved or not) cannot be taken into account.

Further, the present disclosure is also directed to using only MVs and reference picture indices (without using the SIF index) in the pruning process during the HMVP table update.

When a new element is added to an HMVP record, it needs to be decided whether this new element is used in the record comparison or not. The straightforward approach is to use all elements of the HMVP record in the record comparison (default C-style structure comparison). In the present disclosure, however, the IF index, is not used in the HMVP record comparison. There are two reasons for this design:

The first reason is to avoid additional computational complexity. Each comparison operation will incur additional computational operations in the HMVP table updating process and the merge candidate construction processes. So, if comparison operations can be reduced or eliminated, the computational complexity can be reduced thereby increasing the coding efficiency. From the implementation point of view, a better implementation can be achieved if unnecessary comparisons can be avoided here. So, instead of using default C-style structure comparison of HMVP records, HMVP record elements are split into the two subsets: elements used in record comparison and elements not used in record comparison.

The second reason is to preserve HMVP record diversity. For example, it is not efficient to have two HMVP records having the same MVs and reference indices and differing only in their IF indices because these two records are not "sufficiently different." Instead, it is more efficient, during the HMVP table update process, to consider them to be the same. In this case, a new record, that differs from an existing record only in the IF index, would not be added to the HMVP table. As a result, "old" record that is "sufficiently different" (having different MVs or reference indices) from the other records would be preserved. In other words, for a new record to be added to the HMVP table, this new record should be not just bitwise different from the existing records but it needs to be "substantially different." From the coding efficiency point of view, it is more efficient to have two records with different MVs or reference indices in the HMVP table than two records differing only in the IF indices.

Further, the present disclosure is also directed to restrictions for merging switchable interpolation filter (SIF) parameters for saving line memory. Compare to the previous design of SIF, the presented disclosure introduces a method to apply SIF on top of motion information inheriting tool without increased line memory, which saves the line memory bandwidth. For high resolution cases, the saving of line memory will significantly reduce the on-chip memory cost.

The modified IF index derivation method improves coding efficiency due to using more appropriate IF index for CUs coded in the merge mode and having a merge index corresponding to history-based merge candidates.

The mathematical operators used in this application are similar to those used in the C programming language, and can be refer to the mathematical operators of HEVC standard specification. However, the results of integer division and arithmetic shift operations are defined more precisely, and additional operations are defined, such as exponentiation and real-valued division. Numbering and counting conventions generally begin from 0, e.g., “the first” is equivalent to the 0-th, “the second” is equivalent to the 1-th, etc.

Following is an explanation of the applications of the encoding method as well as the decoding method as shown in the above-mentioned embodiments, and a system using them.

Figure 18:
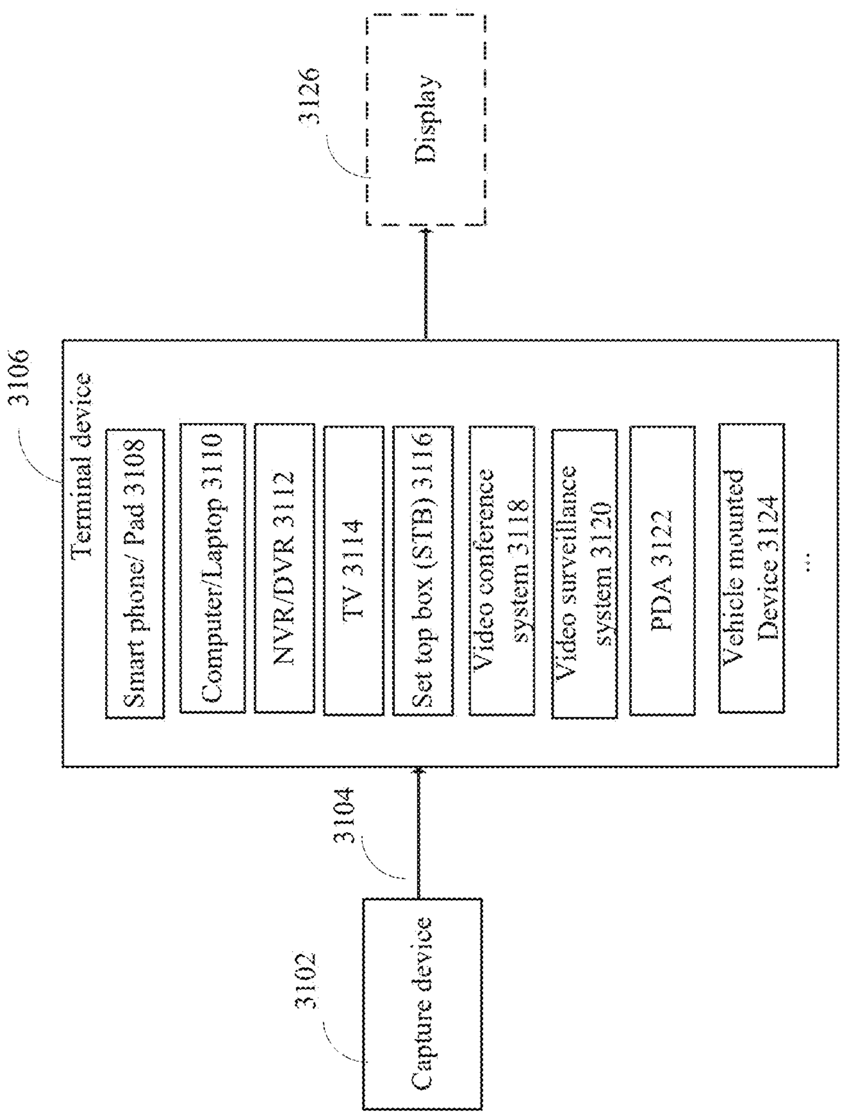
FIG. 18 is a block diagram showing an example structure of a content supply system which realizes a content delivery service.

FIG. 18 is a block diagram showing a content supply system 3100 for realizing content distribution service. This content supply system 3100 includes capture device 3102, terminal device 3106, and may include display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 19:
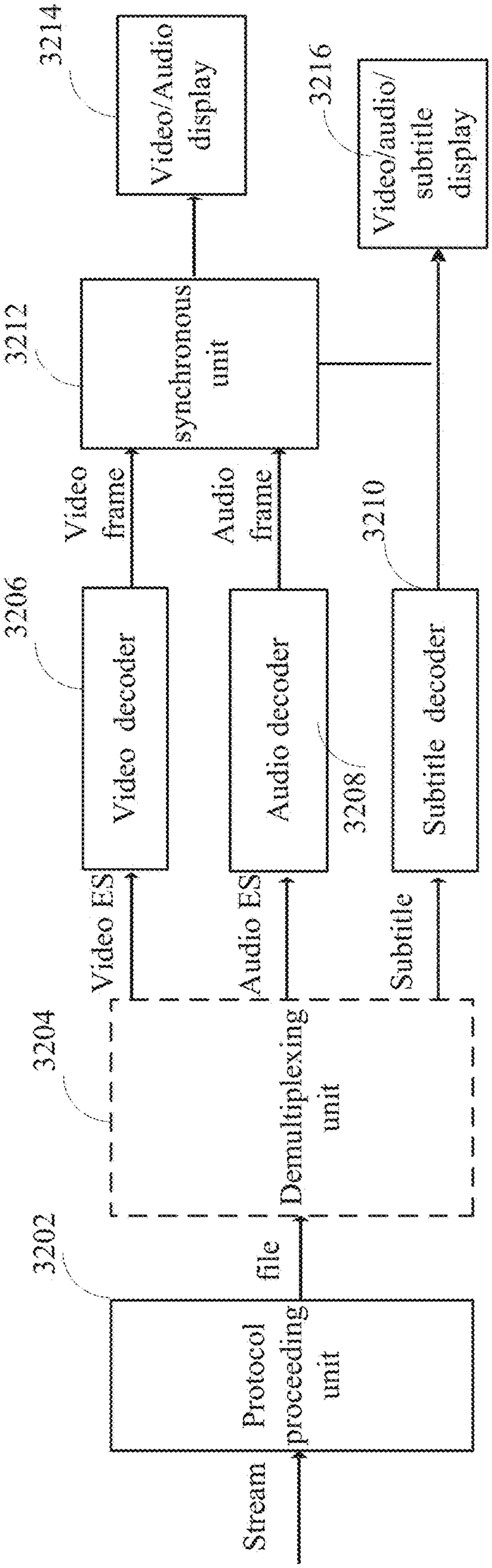
FIG. 19 is a block diagram showing a structure of an example of a terminal device. In the following identical reference signs refer to identical or at least functionally equivalent features if not explicitly specified otherwise.

FIG. 19 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream(ES), audio ES, and subtitle (which may be optional in some embodiments) are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 19) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general, only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the embodiments described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the embodiments described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for decoding a block in a frame of a video signal, the method comprising:

performing entropy decoding on a received bitstream to obtain quantized coefficients and syntax elements;

applying inverse quantization on the quantized coefficients to obtain dequantized coefficients;

applying inverse transform on the dequantized coefficients to obtain a reconstructed residual block;

performing inter prediction for the block in the frame of the video signal to obtain a prediction block, comprising:

constructing a history-based motion information candidate list, wherein the history-based motion information candidate list is an ordered list comprising N history-based motion information candidates $H_k$, k=0, . . . , N−1, containing motion information of N preceding blocks preceding the block, wherein N is an integer greater than 0, wherein each history-based motion information candidate comprises:

i) one or more motion vectors (MVs), ii) one or more reference picture indices corresponding to the MVs, and iii) an interpolation filter (IF) index;

adding one or more of the N history-based motion information candidates $H_k$ from the history-based motion information candidate list into a motion information candidate list for the block; and deriving motion information of the block based on the motion information candidate list, wherein the motion information of the block is used for inter prediction for the block to obtain the prediction block; and adding the reconstructed residual block to the prediction block to obtain a reconstructed block of the block;

wherein a history-based motion information candidate $H_k$, k=N, containing the motion information of the block is added to the history-based motion information candidate list when it is determined that at least one of the following elements of each history-based motion information candidate of the history-based motion information candidate list differs from a corresponding element of the motion information of the block:

i) the one or more MVs, or ii) the one or more reference picture indices corresponding to the one or more MVs;

wherein the determination of the at least one of the elements of each history-based motion information candidate of the history-based motion information candidate list differs from the corresponding element of the motion information of the block comprises:

comparing whether the one or more MVs of a history-based motion information candidate in the history-based motion information candidate list are same as corresponding one or more MVs of the block; and comparing whether the one or more reference picture indices of the history-based motion information candidate are same as corresponding one or more reference picture indices of the block, wherein the comparison is performed on checking differences with respect to the one or more MVs and the one or more reference picture indices, without comparison of the IF index.

2. The method according to claim 1, wherein an alternative half-sample interpolation filter is applied only when at least one of one or more MVs of the derived motion information of the block points to a half-sample position, wherein the alternative half-sample interpolation filter is indicated by an IF index of the derived motion information.

3. The method according to claim 2, wherein the IF index of the history-based motion information candidate indicates a half-sample interpolation filter among a set of half-sample interpolation filters, wherein the half-sample interpolation filter is applied for interpolating a half-sample value when at least one of the one or more MVs of the history-based motion information candidate points to the half-sample position.

4. The method according to claim 1, wherein the N preceding blocks are from a same frame as the block, and the N preceding blocks include non-adjacent blocks of the block.

5. The method according to claim 1, wherein the history-based motion information candidate list has a length of N, and N is 5.

6. The method according to claim 1, wherein the motion information candidate list is used for a merge mode or a skip mode.

7. A decoder, comprising:

one or more processors; and a non-transitory computer-readable storage medium coupled to the one or more processors and storing programming instructions, which when executed by the one or more processors, cause the decoder to perform operations for decoding a block in a frame of a video signal, the operations comprising:

performing entropy decoding on a received bitstream to obtain quantized coefficients and syntax elements;

applying inverse quantization on the quantized coefficients to obtain dequantized coefficients;

applying inverse transform on the dequantized coefficients to obtain a reconstructed residual block;

performing inter prediction for the block in the frame of the video signal to obtain a prediction block, comprising:

constructing a history-based motion information candidate list, wherein the history-based motion information candidate list is an ordered list comprising N history-based motion information candidates $H_k$, k=0, . . . , N−1, containing motion information of N preceding blocks preceding the block, wherein N is an integer greater than 0, wherein each history-based motion information candidate comprises:

i) one or more motion vectors (MVs), ii) one or more reference picture indices corresponding to the MVs, and iii) an interpolation filter (IF) index;

adding one or more of the N history-based motion information candidates $H_k$ from the history-based motion information candidate list into a motion information candidate list for the block; and deriving motion information of the block based on the motion information candidate list, wherein the motion information of the block is used for inter prediction for the block to obtain the prediction block; and adding the reconstructed residual block to the prediction block to obtain a reconstructed block of the block;

wherein a history-based motion information candidate $H_k$, k=N, containing the motion information of the block is added to the history-based motion information candidate list when it is determined that at least one of the following elements of each history-based motion information candidate of the history-based motion information candidate list differs from a corresponding element of the motion information of the block:

i) the one or more MVs, or ii) the one or more reference picture indices corresponding to the one or more MVs;

wherein the determination of the at least one of the elements of each history-based motion information candidate of the history-based motion information candidate list differs from the corresponding element of the motion information of the block comprises:

comparing whether the one or more MVs of a history-based motion information candidate in the history-based motion information candidate list are same as corresponding one or more MVs of the block; and comparing whether the one or more reference picture indices of the history-based motion information candidate are same as corresponding one or more reference picture indices of the block, wherein the comparison is performed on checking differences with respect to the one or more MVs and the one or more reference picture indices, without comparison of the IF index.

8. The decoder according to claim 7, wherein an alternative half-sample interpolation filter is applied when at least one of one or more MVs of the derived motion information of the block points to a half-sample position, wherein the alternative half-sample interpolation filter is indicated by an IF index of the derived motion information.

9. The decoder according to claim 8, wherein the IF index of the history-based motion information candidate indicates a half-sample interpolation filter among a set of half-sample interpolation filters, wherein the half-sample interpolation filter is applied for interpolating a half-sample value when at least one of the one or more MVs of the history-based motion information candidate points to the half-sample position.

10. The decoder according to claim 7, wherein the N preceding blocks are from a same frame as the block, and the N preceding blocks include non-adjacent blocks of the block.

11. The decoder according to claim 7, wherein the history-based motion information candidate list has a length of N, and N is 5.

12. The decoder according to claim 7, wherein the motion information candidate list is used for a merge mode or a skip mode.

13. A non-transitory computer-readable medium storing a program code, which when executed by a computer device, causes the computer device to perform operations for decoding a block in a frame of a video signal, the operations comprising:

performing entropy decoding on a received bitstream to obtain quantized coefficients and syntax elements;

applying inverse quantization on the quantized coefficients to obtain dequantized coefficients;

applying inverse transform on the dequantized coefficients to obtain a reconstructed residual block;

performing inter prediction for the block in the frame of the video signal to obtain a prediction block, comprising:

constructing a history-based motion information candidate list, wherein the history-based motion information candidate list is an ordered list comprising N history-based motion information candidates $H_k$, k=0, . . . , N−1, containing motion information of N preceding blocks preceding the block, wherein N is an integer greater than 0, wherein each history-based motion information candidate comprises:

i) one or more motion vectors (MVs), ii) one or more reference picture indices corresponding to the MVs, and iii) an interpolation filter (IF) index;

adding one or more of the N history-based motion information candidates $H_k$ from the history-based motion information candidate list into a motion information candidate list for the block; and deriving motion information of the block based on the motion information candidate list, wherein the motion information of the block is used for inter prediction for the block to obtain the prediction block; and adding the reconstructed residual block to the prediction block to obtain a reconstructed block of the block;

wherein a history-based motion information candidate $H_k$, k=N, containing the motion information of the block is added to the history-based motion information candidate list when it is determined that at least one of the following elements of each history-based motion information candidate of the history-based motion information candidate list differs from a corresponding element of the motion information of the block:

i) the one or more MVs, or ii) the one or more reference picture indices corresponding to the one or more MVs;

wherein the determination of the at least one of the elements of each history-based motion information candidate of the history-based motion information candidate list differs from the corresponding element of the motion information of the block comprises:

comparing whether the one or more MVs of a history-based motion information candidate in the history-based motion information candidate list are same as corresponding one or more MVs of the block; and comparing whether the one or more reference picture indices of the history-based motion information candidate are same as corresponding one or more reference picture indices of the block, wherein the comparison is performed on checking differences with respect to the one or more MVs and the one or more reference picture indices, without comparison of the IF index.

14. The non-transitory computer-readable medium according to claim 13, wherein an alternative half-sample interpolation filter is applied when at least one of one or more MVs of the derived motion information of the block points to a half-sample position, wherein the alternative half-sample interpolation filter is indicated by the IF index of the derived motion information.

15. The non-transitory computer-readable medium according to claim 14, wherein the IF index of the history-based motion information candidate indicates a half-sample interpolation filter among a set of half-sample interpolation filters, wherein the half-sample interpolation filter is applied for interpolating a half-sample value when at least one of the one or more MVs of the history-based motion information candidate points to the half-sample position.

16. The non-transitory computer-readable medium according to claim 13, wherein the N preceding blocks are from a same frame as the block, and the N preceding blocks include non-adjacent blocks of the block.

17. The non-transitory computer-readable medium according to claim 13, wherein the history-based motion information candidate list has a length of N, and N is 5.

18. The non-transitory computer-readable medium according to claim 13, wherein the motion information candidate list is used for a merge mode or a skip mode.

* * * * *